US011514468B2

(12) United States Patent
Isaacson et al.

(10) Patent No.: US 11,514,468 B2
(45) Date of Patent: Nov. 29, 2022

(54) MARKET LIQUIDITY INCENTIVE SYSTEMS AND METHODS

(71) Applicant: Cboe Exchange, Inc., Chicago, IL (US)

(72) Inventors: Christopher A. Isaacson, Olathe, KS (US); Phillip J. Ratterman, Olathe, KS (US); Kenneth E. Conklin, III, Olathe, KS (US); Brian M. King, Overland Park, KS (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 16/776,005

(22) Filed: Jan. 29, 2020

(65) Prior Publication Data

US 2020/0167816 A1    May 28, 2020

Related U.S. Application Data

(63) Continuation of application No. 14/133,630, filed on Dec. 18, 2013, now Pat. No. 10,565,608.

(60) Provisional application No. 61/739,010, filed on Dec. 18, 2012.

(51) Int. Cl.
    *G06Q 30/02*     (2012.01)
    *G06Q 40/04*     (2012.01)

(52) U.S. Cl.
    CPC ......... *G06Q 30/0222* (2013.01); *G06Q 40/04* (2013.01)

(58) Field of Classification Search
    CPC .................................................. G06Q 30/0222
    See application file for complete search history.

(56) References Cited

U.S. PATENT DOCUMENTS

| 7,162,447 | B1 * | 1/2007 | Cushing | G06Q 30/0283 |
| | | | | 705/35 |
| 7,912,775 | B1 * | 3/2011 | Brill | G06Q 40/00 |
| | | | | 705/36 R |
| 8,346,652 | B2 * | 1/2013 | Smith | G06Q 40/00 |
| | | | | 705/37 |
| 8,577,787 | B1 * | 11/2013 | Gastineau | G06Q 40/06 |
| | | | | 705/37 |
| 11,068,979 | B1 * | 7/2021 | Givot | G06Q 40/04 |
| 2010/0004999 | A1 * | 1/2010 | DePetris | G06Q 40/04 |
| | | | | 705/14.71 |
| 2013/0132254 | A1 * | 5/2013 | Fraser | G06Q 40/04 |
| | | | | 705/37 |

* cited by examiner

*Primary Examiner* — Azam A Ansari
(74) *Attorney, Agent, or Firm* — Fish & Richardson P.C.

(57) ABSTRACT

A system and method determine rewards or other incentives for market participants submitting orders for financial instruments on a financial exchange. The system and method determine if orders submitted by one or more market participants are eligible for a reward or other incentive by identifying orders that are at a best bid or offer for a corresponding financial instrument. The system and method determine a number of eligible orders submitted by each of the one or more market participants and applies a reward or other incentive to a particular market participant with the most eligible orders or greatest aggregate size of eligible orders.

20 Claims, 17 Drawing Sheets

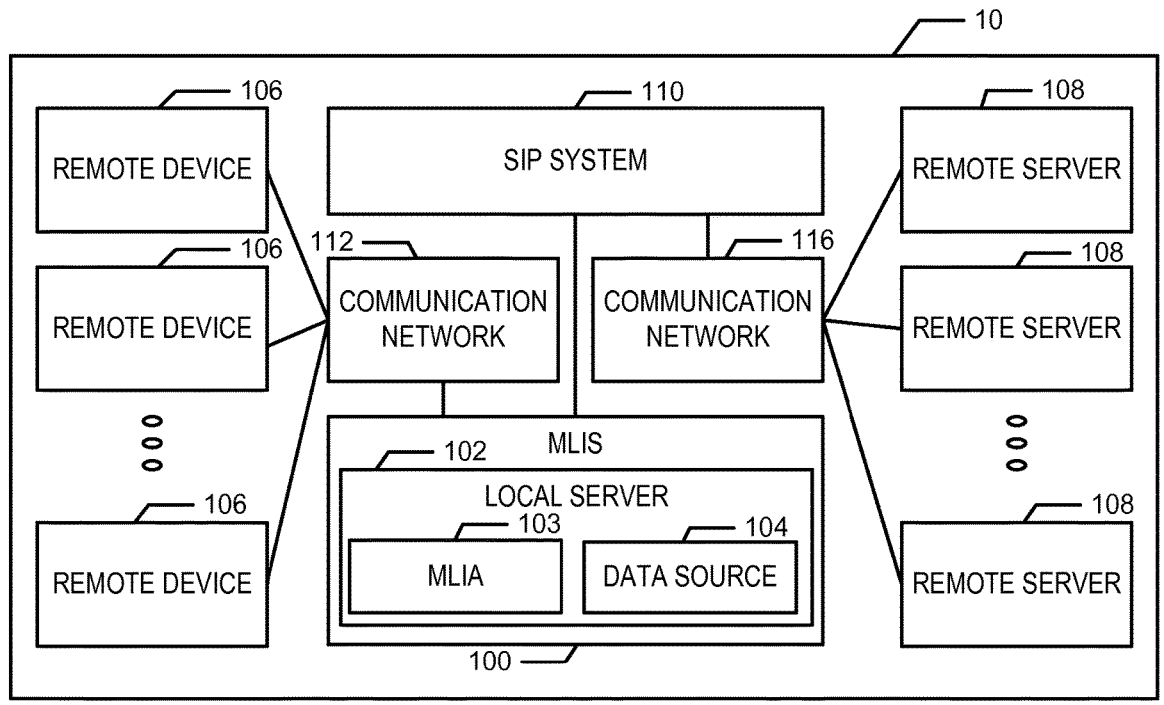
FIG. 1A
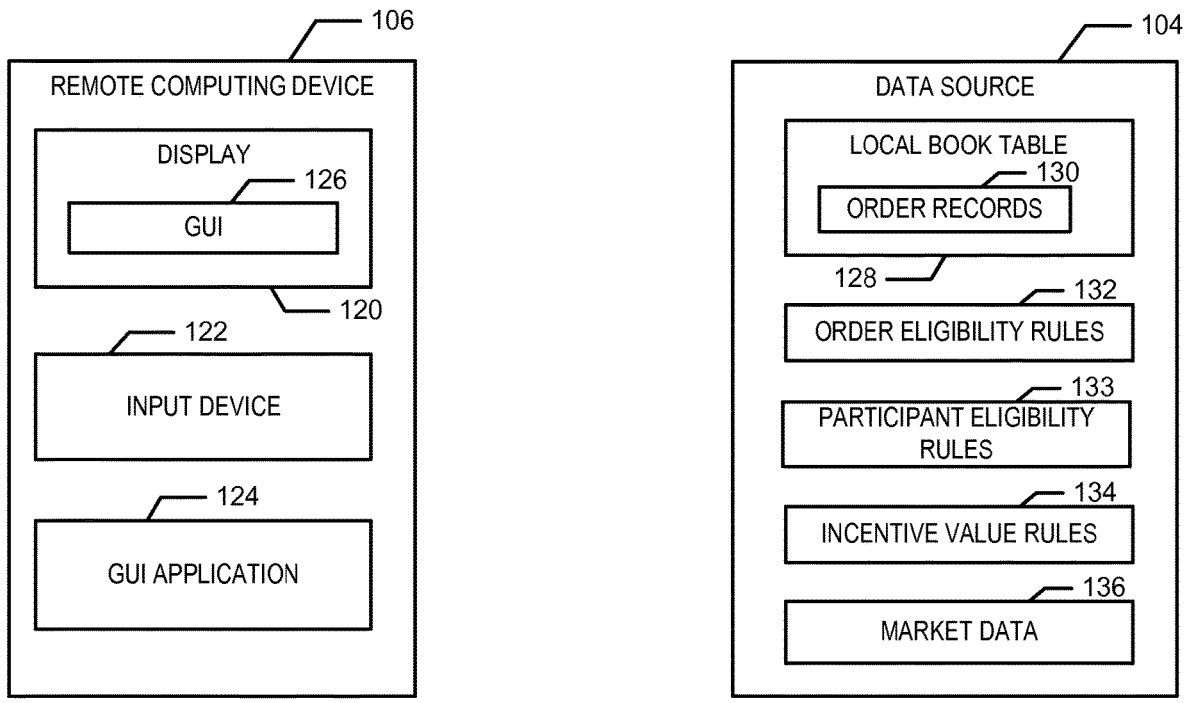
FIG. 1B
FIG. 1C

| TAG | VALUE | COMMENT |
|---|---|---|
| STANDARD HEADER | | |
| 8 | FIX 4.3 | BEGIN STRING - ALWAYS FIRST FIELD |
| 9 | N BYTES | LENGTH OF MESSAGE |
| 35 | A | INDICATES TYPE OF MESSAGE |
| 49 | ABC | SENDING FIRM ID (I.E., MPID) |
| 56 | SBST | RECEIVING FIRM ID |
| 52 | 10:10:30AM | TIME THE MSG WAS SENT |
| MESSAGE BODY | | |
| 1 | AAA111 | ACCOUNT NUMBER |
| 11 | 123ABC456 | CLIENT ORDER ID - ASSIGNED BY SENDER |
| 18 | B | INSTRUCTIONS FOR ORDER ON EXCHANGE (B=OK TO CROSS) |
| 21 | 3 | INSTRUCTIONS FOR BROKER (3=MANUAL ORDER, BEST EXECUTION) |
| 38 | 1000 | ORDER QUANTITY |
| 40 | LIMIT | ORDER TYPE |
| 44 | 31.23 | PRICE |
| 54 | 1 | SIDE OF THE TRADE (1=BUY) |
| 55 | LPINVNQ | SECURITY ID (E.G., SYMBOL) |
| 59 | 0 | TIME IN FORCE |
| 60 | 10:08:00 AM | TIME THIS ORDER WAS CREATED |
| 63 | 0 | SETTLEMENT TYPE (0=REGULAR) |
| 167 | OPT | SECURITY TYPE |
| 581 | 1 | ACCOUNT TYPE (1=CUSTOMER) |
| STANDARD TRAILER | | |
| 10 | 1234567 | CHECKSUM |

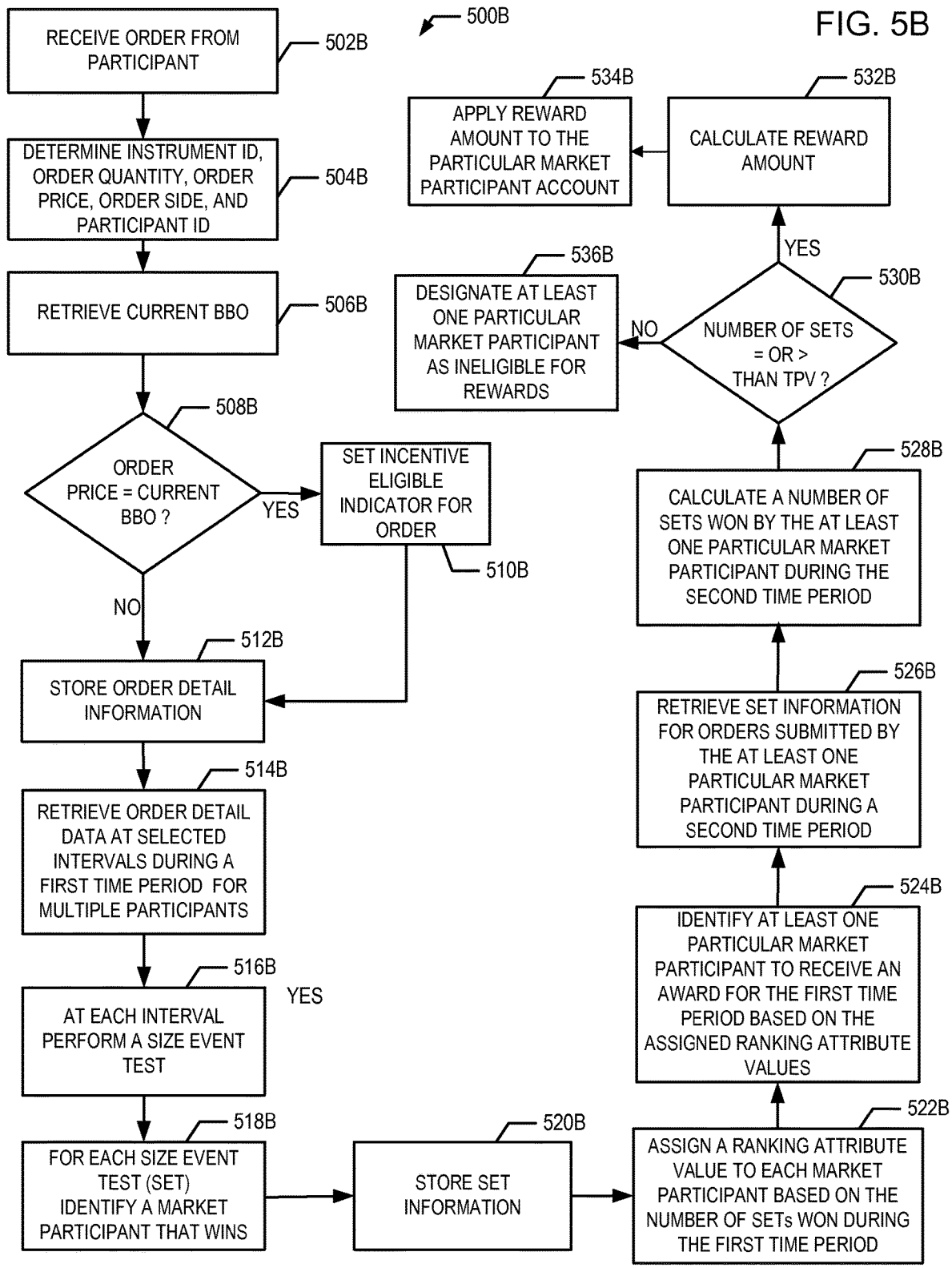

FIG. 10

- 1004: SELECT MARKET DATA WITH ORDER DATA AND BBO DATA FOR ONE OR MORE SELECTED TIMES IN SELECTED PERIOD
- 1006: FOR EACH SELECTED TIME IN SELECTED PERIOD, ANALYZE ORDER DATA AND BBO DATA
- 1008: INCREMENT VALUE OF EVENT PARAMETER FOR EACH MARKET PARTICIPANT WITH GREATEST TOTAL NUMBER OF RESTING SHARES FROM ONE OR MORE ORDERS FOR A PARTICULAR FINANCIAL INSTRUMENT AT THE FINANCIAL INSTRUMENT'S BEST BID TO BUY AND/OR BEST OFFER TO SELL
- 1010: MORE TIMES? YES → back to 1006; NO ↓
- 1012: ANALYZE EVENT PARAMETER VALUES
- 1014: SELECT MARKET PARTICIPANT THAT HAS THE HIGHEST EVENT PARM. VALUE IN THE SELECTED PERIOD TO BE THE MARKET PARTICIPANT THAT HAS EARNED THE INCENTIVE
- 1016: APPLY INCENTIVE TO THE SELECTED MARKET PARTICIPANT

FIG. 11

- 1104: SELECT MARKET DATA WITH ORDER DATA AND BBO DATA FOR ONE OR MORE SELECTED TIMES IN SELECTED PERIOD
- 1106: FOR EACH SELECTED TIME IN SELECTED PERIOD, COMPARE AGG. SHARE DATA AND BBO DATA
- 1108: INCREMENT VALUE OF EVENT PARAMETER FOR EACH MARKET PARTICIPANT WITH GREATEST NUMBER OF RESTING SHARES FROM ONE OR MORE ORDERS FOR A PARTICULAR FINANCIAL INSTRUMENT AT THE FINANCIAL INSTRUMENT'S BEST BID TO BUY AND/OR BEST OFFER TO SELL
- 1110: MORE TIMES? YES → back to 1106; NO ↓
- 1112: ANALYZE EVENT PARAMETER VALUES
- 1114: SELECT MARKET PARTICIPANT THAT HAS THE HIGHEST EVENT PARM. VALUE IN THE SELECTED PERIOD TO BE THE MARKET PARTICIPANT THAT HAS EARNED THE INCENTIVE
- 1116: APPLY INCENTIVE TO THE SELECTED MARKET PARTICIPANT

- 1204 SELECT MARKET DATA WITH ORDER DATA AND BBO DATA FOR ONE OR MORE SELECTED TIMES IN SELECTED PERIOD
- 1206 FOR EACH SELECTED TIME IN SELECTED PERIOD, ANALYZE AGG. SHARE DATA AND BBO DATA
- 1208 ASSIGN UNIT OF VALUE TO THE MARKET PARTICIPANT THAT HAS THE GREATEST NUMBER OF RESTING SHARES AT THE BEST BID AND ASSIGN UNIT OF VALUE TO MARKET PARTICIPANT THAT HAS THE GREATEST NUMBER OF RESTING SHARES AT THE BEST OFFER
- 1210 MORE TIMES? YES → back to 1206; NO ↓
- 1212 ANALYZE UNITS FOR EACH MARKET PARTICIPANT
- 1214 SELECT MARKET PARTICIPANT THAT HAS THE HIGHEST NUMBER OF UNITS IN THE SELECTED PERIOD TO BE THE MARKET PARTICIPANT THAT HAS EARNED THE INCENTIVE
- 1216 APPLY INCENTIVE TO THE SELECTED MARKET PARTICIPANT

- 1304 SELECT MARKET DATA WITH ORDER DATA AND BBO DATA FOR ONE OR MORE SELECTED TIMES IN SELECTED PERIOD
- 1306 FOR EACH SELECTED TIME IN SELECTED PERIOD, ANALYZE AGG. SHARE DATA AND BBO DATA
- 1308 ASSIGN UNIT OF VALUE TO THE MARKET PARTICIPANT THAT HAS THE GREATEST NUMBER OF RESTING SHARES AT THE BEST BID AND/OR BEST OFFER
- 1310 MORE TIMES? YES → back to 1306; NO ↓
- 1312 ANALYZE UNITS FOR EACH MARKET PARTICIPANT
- 1314 SELECT MARKET PARTICIPANT THAT HAS THE HIGHEST NUMBER OF UNITS IN THE SELECTED PERIOD TO BE THE MARKET PARTICIPANT THAT HAS EARNED THE INCENTIVE
- 1316 APPLY INCENTIVE TO THE SELECTED MARKET PARTICIPANT

MARKET LIQUIDITY INCENTIVE SYSTEMS AND METHODS

RELATED APPLICATIONS

The present application is a continuation of U.S. patent application Ser. No. 14/133,630, filed Dec. 18, 2013, entitled Market Liquidity Incentive Systems and Methods, which takes priority to U.S. Patent App. No. 61/739,010, filed Dec. 18, 2012, entitled Market Liquidity Incentive Systems and Methods, the entire contents of which are incorporated herein by reference.

FEDERALLY SPONSORED RESEARCH OR DEVELOPMENT

Not Applicable.

COMPACT DISK APPENDIX

Not Applicable.

BACKGROUND

A financial exchange is a market, physical or electronic, in which shares, options, derivatives, futures, and other units of financial instruments are bought and sold. Financial instruments include, for example, equities, stocks, bonds, commodities, indexes, exchange-traded funds, and other instruments.

Exchange-traded funds (ETF), also known as exchange-traded products (ETP), are securities that represent a legal right of ownership over an underlying portfolio of securities or other assets held by the issuing fund. The assets held in an ETF may include individual stocks, bonds, cash, commodities, derivatives, or any tradable asset, including contracts based on the value of any of the foregoing. Shares of an ETF are designed to be listed on a securities exchange and traded over the exchange just like other securities. ETFs thus allow an investor to own a set or "basket" of assets by simply purchasing shares in the individual ETF.

ETFs have sometimes been viewed as a more liquid alternative to mutual funds. ETFs enable investors to gain a broad diversification and can be traded during market hours. In addition, ETFs enable institutional investors to quickly enter and exit positions, making them a valuable tool in situations where cash is needed to be raised quickly. Institutional investors may buy or sell creation units, which are the baskets of the underlying shares which make up each ETF.

A financial exchange matches bids to buy a particular financial instrument, such as a security, equity, option, or other instrument, with offers to sell that particular financial instrument and to identify a price and volume at which a trade for the financial instrument can be executed. The introduction of electronic trading systems into such exchanges has enabled investors to place orders for financial instruments over a computer network and receive the status of orders in near real time. These trading systems also report prices at which financial instruments are quoted, bought, and sold to reporting entities that consolidate trading information and disseminate trading data, such as a best bid or offer (BBO) for the financial instrument.

One advantage of such trading systems is that marketable orders generally can be executed immediately against available contra-side interests. An order is marketable when it is priced equal to or more aggressively than the contra side interest. For example, a buy order for a financial instrument is marketable when it is priced equal to or more aggressively than the current best offer for the financial instrument, and a sell order for a financial instrument is marketable when it is priced equal to or more aggressively than the current best bid for the financial instrument. In this context, more aggressive means higher for a bid to buy or lower for an offer to sell.

Lower levels of liquidity lead to greater bid-ask spreads, (i.e. spreads in prices between bids and offers) larger discrepancies between net asset value and the value of the underlying securities, and a decreased ability to trade profitably. It is preferable to reduce the difference in prices between the best bid to buy and the best offer to sell. Such a tighter market is better for market participants.

SUMMARY

In one aspect, a market liquidity incentive system selects market data for shares on the financial exchange's book for one or more selected times. The market data includes order data for resting shares, including the total number of resting shares from one or more orders of one or more financial instruments from each of one or more participants and the corresponding prices for the resting shares from each order, and the best bids to buy and/or best offers to sell for the financial instruments for the one or more selected times. For each selected time, the market liquidity system analyzes the order data and the best bids to buy and best offers to sell and increments a counter value by a selected value for each market participant that has the greatest total number of resting shares from one or more orders for a particular financial instrument at the financial instrument's best bid to buy or best offer to sell. The incentive system analyzes the counter values assigned to each market participant for a selected period and selects the market participant that has the highest counter value in the selected period to be the market participant that has earned an incentive.

In another aspect, a market liquidity incentive system selects market data for shares on the financial exchange's book for one or more selected times. The market data includes order data for resting shares, including the total number of resting shares from one or more orders of one or more financial instruments from each of one or more participants and the corresponding prices for the resting shares from each order, and the best bids to buy and/or best offers to sell for the financial instruments for the one or more selected times. For each selected time, the market liquidity system analyzes the order data and the best bids to buy and best offers to sell and increments a counter value by a selected value for each market participant that has the greatest total number of resting shares from one or more orders for a particular financial instrument at the financial instrument's best bid to buy and best offer to sell. The incentive system analyzes the counter values assigned to each market participant for a selected period and selects the market participant that has the highest counter value in the selected period to be the market participant that has earned an incentive.

In another aspect, the selected value is a unit. In another aspect, the selected value is the total number of resting shares from the one or more orders for the particular financial instrument at the financial instrument's best bid to buy or best offer to sell. In another aspect, the selected value is the total number of resting shares from the one or more orders for the particular financial instrument at the financial instrument's best bid to buy and best offer to sell.

In another aspect, the one or more selected times may be one or more time increments or one or more other selected times. In one example, the one or more selected times are one or more time increments. In another example, the one or more selected times are one or more one-second time increments. In another example, the one or more selected times are one or more times during a trading day. In another example, the one or more selected times alternately may be one or more randomized times or one or more non-randomized times. A combination of one or more of the forgoing may be made.

The selected period may be, for example, a trading day (including regular hours only, extended trading hours, auction hours, or a combination of one or more of the foregoing), a week with one or more trading days, a month with one or more trading days, an hour, multiple hours, or another period of time or events.

In one example, the market liquidity incentive system selects and compares the market data at the one or more selected times during the selected period. In another example, the market liquidity incentive system selects and compares the market data for the selected times, not necessarily at the one or more selected times and not necessarily during the selected period. In another example, the market liquidity incentive system analyzes the counter values for each market participant for the selected period, not necessarily at or during the selected period.

In another aspect, the market liquidity incentive system uses a parameter, such as an event parameter, instead of a counter. The market liquidity incentive system increments an event parameter by a value or assigns or otherwise stores a value to the event parameter for a market participant instead of incrementing a counter value for the market participant.

In another aspect, the market liquidity incentive system measures the total liquidity across a trading day for an aggregate best bid to buy and best offer to sell, instead of for a best bid to buy or best offer to sell. The aggregate best bid to buy and best offer to sell shares is the total number of shares at the best bid to buy plus the total number of shares at the best offer to sell. The market liquidity incentive system selects market data for shares on the financial exchange's book (e.g. resting shares), such as market data for one or more selected times during a trading day. The market data includes order data for resting shares, including the total number of resting shares from one or more orders of one or more financial instruments from each of one or more participants and the corresponding prices for the resting shares from each order, and the best bids to buy and/or best offers to sell for the financial instruments. The market liquidity incentive system has a counter for each market participant. The count or value for the counter may, for example, start at zero or another value. For each selected time, the market liquidity incentive system analyzes the order data and the best bids to buy and best offers to sell at that time (such as by comparing the order data for each market participant for the selected time) and increments a counter value of a market participant's counter for each market participant that has the greatest total number of resting shares from one or more orders from the market participant for a particular financial instrument at the financial instrument's best bid to buy and best offer to sell. In one example, the counter value is incremented by the total number of resting shares from the one or more orders for the particular financial instrument that were at the financial instrument's best bid to buy and best offer to sell for the selected time. In another example, the counter value is incremented by a unit, such as by 1 (e.g. from 0 to 1, from 1 to 2, etc) or another unit. The incentive system analyzes the counter values assigned to each market participant for a selected period to determine the market participant that has the highest counter value in the selected period (such as by comparing the values of each market participant's counter), such as a trading day, and selects the market participant that has the highest counter value in the selected period to be the market participant that has earned the incentive.

In another aspect, the market liquidity incentive system selects market data for shares on the financial exchange's book (e.g. resting shares), such as market data for a selected time point. The market data includes order data for resting shares, including the number of resting shares from one or more orders of one or more financial instruments from each of one or more participants and the corresponding prices for the resting shares, and financial instruments BBO data. Financial instrument BBO data includes data identifying the best bid to buy for a financial instrument and/or the best offer to sell for the financial instrument or such data for multiple financial instruments. The market liquidity incentive system has a counter for each market participant. The count or value for the counter may, for example, start at zero or another value. The market liquidity system analyzes the order data and the best bids to buy and best offers to sell (such as by comparing the order data for each participant) and increments a counter value for each market participant that has the greatest total number of resting shares from one or more orders for a particular financial instrument at the financial instrument's best bid or best offer for that selected point in time. The market liquidity incentive system optionally selects market data for the financial exchange for one or more additional points in time during a trading day, analyzes the order data and the BBO data for each additional point in time (such as by comparing the order data for each participant), and increments a counter value for each market participant that has the greatest total number of resting shares from one or more orders for a financial instrument at the best bid or best offer. The market liquidity incentive system analyzes the values of the counter assigned to each market participant to each other for a selected period (such as by comparing the values of each market participant's counter to the values of each other market participant's counter), such as a trading day or other period, and selects the market participant that has the highest counter value in the selected period to be the market participant that has earned the incentive.

For example, the market liquidity incentive system has an event parameter for each market participant. The market liquidity incentive system analyzes the order data and the best bids to buy and best offers to sell and increments an event parameter value of a market participant's event parameter for each market participant that has the greatest total number of resting shares from one or more orders for a particular financial instrument at the financial instrument's best bid to buy and/or best offer to sell. In one example, the event parameter value is incremented by the total number of resting shares from the one or more orders for the particular financial instrument that were at the financial instrument's best bid to buy and/or best offer to sell for the selected time. In another example, the event parameter value is incremented by a unit, such as by 1 (e.g. from 0 to 1, from 1 to 2, etc) or another unit. The market liquidity incentive system analyzes the event parameter values assigned to each market participant for a selected period to determine the market participant that has the highest event parameter value in the selected period (such as by comparing the values of each market participant's event parameter to the values of each other market participant's event parameter), such as a trading day, and selects the market participant that has the highest event parameter value in the selected period to be the market participant that has earned the incentive.

In one aspect, the market liquidity incentive system compares an aggregate number of shares of a financial instrument resting on the exchange's book from each of one or more market participants to a best bid or best offer for the financial instrument. The aggregate number of shares is the total number of shares from one or more orders from a market participant. The aggregate number of resting shares is the total number of resting shares from one or more orders from a market participant.

The market liquidity incentive system increments a count or value of an event parameter assigned to the market participant that has the greatest aggregate number of resting shares at the best bid or best offer at a selected time (alternately, when the comparison is made). The value for the parameter may, for example, start at zero. The market liquidity incentive system analyzes the parameter value assigned to each market participant for a selected period (such as by comparing the parameter values for each market participant) and selects the market participant that has the greatest event parameter value (for example, the highest value in the event parameter) in the selected period to be the market participant that has earned the incentive.

In another aspect, the market liquidity incentive system analyzes the aggregate number of resting shares of a financial instrument from one or more market participants on the exchange's book to a best bid or best offer for the financial instrument, such as by comparing the aggregate number of resting shares of a financial instrument for each market participant. The market liquidity incentive system assigns a unit of value to the market participant that has the greatest aggregate number of resting shares at the best bid and assigns a unit of value to the market participant that has the greatest aggregate number of resting shares at the best offer when the analysis is made. The market liquidity incentive system analyzes the number of units assigned to each market participant for a selected period, such as by comparing the number of units assigned to each market participant for the selected period. The market liquidity incentive system selects the market participant that has the greatest number of units in the selected period to be the market participant that has earned the incentive. In one aspect, the market liquidity incentive system awards, assigns, or issues the incentive to the selected market participant.

In another aspect, the market liquidity incentive system analyzes the aggregate number of resting shares of a financial instrument from one or more market participants on the exchange's book to a best bid or best offer for the financial instrument, such as by comparing the aggregate number of resting shares of a financial instrument for each market participant. The market liquidity incentive system assigns a unit of value to the market participant that has the greatest aggregate number of resting shares at the best bid and best offer when the analysis is made. The market liquidity incentive system analyzes the number of units assigned to each market participant for a selected period, such as by comparing the number of units assigned to each market participant for the selected period. The market liquidity incentive system selects the market participant that has the greatest number of units in the selected period to be the market participant that has earned the incentive. In one aspect, the market liquidity incentive system awards, assigns, or issues the incentive to the selected market participant.

In another aspect, the best bid is the current best bid for the financial instrument, and the best offer is the current best offer for the financial instrument.

In another aspect, the market liquidity incentive system performs one or more size event tests (SETs). A SET is a determination by the market liquidity incentive system of the aggregate order size of each financial instrument for each participant and the BBO data for each financial instrument. The aggregate order size is the total number of shares submitted by a participant in one or more orders and that are resting on the exchange's book at a selected time. The BBO data includes data identifying the best bid to buy for a financial instrument and/or the best offer to sell for the financial instrument or such data for multiple financial instruments. A SET result identifies a particular participant as being eligible for a reward or other incentive based on the aggregate order size of orders submitted by that particular participant that include eligible order prices at a best bid to buy and/or a best offer to sell. A participant earns (or wins) a SET when it has the greatest aggregate number of shares in one or more orders that are resting on the exchange's book for a selected time at a best bid to buy the financial instrument and/or a best offer to sell the financial instrument for the selected time.

A SET is performed at one or more test times or test periods. An incentive is awarded to the participant that earns (or wins) the most SETs during a selected period, such as an hour, day, week, month, a trading period, or other period.

In another aspect, a method determines a reward for a market participant submitting at least one order for a financial instrument in a financial market. The method includes identifying, by at least one processor, first order detail data included in each of a first one or more orders from a first market participant, the first order detail data for each first order comprising a first order price, a first instrument identification for a first financial instrument, a first participant identification for the first particular market participant, and a first order size. The method further includes identifying, by the at least one processor, second order detail data included in a second one or more orders received at the at least one processor from a second market participant, the second order detail data for each second order comprising a second order price, a second instrument identification for a second financial instrument, a second participant identification for the second market participant, and a second order size. The at least one processor performs a size event test to each of the first one or more orders and each of the second one or more orders, identifies a first number of the size event tests won by the first market participant and a second number of the size event tests won by the second market participant, and determines a reward amount for at least one of the first market participant and the second market participant based on the first number and the second number.

In another aspect, a market liquidity incentive system for an electronic financial exchange includes a processor, a memory with a counter for each of a plurality of market participants, and an application to be executed executes by the processor. The application, when executed by the processor, selects market data for resting shares on a book for the financial exchange for one or more selected times during a selected period. The market data includes order data for resting shares, including a total number of resting shares from one or more orders of one or more financial instruments from each of one or more participants and corresponding prices for the resting shares, and best bids to buy and best offers to sell for the financial instruments. For each selected time, the application analyzes the order data and the best bids to buy and best offers to sell and increments a counter value of a counter by a selected value for each market participant that has the greatest total number of resting shares from one or more orders for a particular financial instrument at the financial instrument's best bid to buy or best offer to sell. The application analyzes the counter values assigned to each market participant for the selected period to determine the market participant that has a highest counter value in the selected period, selects the market participant that has the highest counter value in the selected period to be the market participant that has earned an incentive, and applies the incentive to the selected market participant.

In another aspect, a market liquidity incentive system includes a processor, a memory with a counter for each of a plurality of market participants, an application to be executed by the processor. The application, when executed by the processor, selects market data for resting shares on an electronic financial exchange's book for one or more selected times during a selected period, the market data comprising order data for resting shares, including a total number of resting shares from one or more orders of one or more financial instruments from each of one or more participants and corresponding prices for the resting shares, and best bids to buy and best offers to sell for the financial instruments. For each selected time, the application analyzes the order data and the best bids to buy and best offers to sell and increment a counter value of a counter for a market participant by a selected value for each market participant that has a greatest total number of resting shares from one or more orders for a particular financial instrument at a financial instrument's best bid to buy or best offer to sell. The application analyzes the counter values assigned to each market participant for the selected period to determine the market participant that has a highest counter value in the selected period, selects the market participant that has the highest counter value in the selected period to be the market participant that has earned the incentive, and applies the incentive to the selected market participant.

In another aspect, a market liquidity incentive method includes, by at least one processor of an electronic financial exchange, selecting market data for resting shares on a book for the financial exchange for one or more selected times during a selected period, the market data comprising order data for resting shares, including a total number of resting shares from one or more orders of one or more financial instruments from each of one or more participants and corresponding prices for the resting shares, and best bids to buy and best offers to sell for the financial instruments. For each selected time, a counter value of a counter is incremented by a selected value for each market participant that has the greatest total number of resting shares from one or more orders for a particular financial instrument at the financial instrument's best bid to buy or best offer to sell. The counter values assigned to each market participant for the selected period are analyzed to determine the market participant that has a highest counter value in the selected period. The market participant that has the highest counter value in the selected period is selected to be the market participant that has earned an incentive. The incentive is applied to the selected market participant.

In another aspect, a market liquidity incentive method includes by at least one processor of an electronic financial exchange, selecting market data for resting shares on a financial exchange's book for one or more selected times during a selected period, the market data comprising order data for resting shares, including a total number of resting shares from one or more orders of one or more financial instruments from each of one or more participants and corresponding prices for the resting shares, and best bids to buy and best offers to sell for the financial instruments. For each selected time, a counter value of a counter for a market participant is incremented by a selected value for each market participant that has a greatest total number of resting shares from one or more orders for a particular financial instrument at a financial instrument's best bid to buy or best offer to sell. The counter values assigned to each market participant for the selected period are analyzed to determine the market participant that has a highest counter value in the selected period. The market participant that has the highest counter value in the selected period is selected to be the market participant that has earned the incentive. The incentive is applied to the selected market participant.

BRIEF DESCRIPTION OF THE DRAWINGS

FIG. 1A is a block diagram of a computing system that includes a market liquidity incentive system.

FIG. 1B depicts an exemplary embodiment of a remote computing device according to one aspect of a market liquidity incentive system.

FIG. 1C depicts an exemplary embodiment of a data source according to an aspect of a market liquidity incentive system.

FIG. 2 depicts exemplary message format data for an order according to an aspect of a market liquidity incentive system.

FIGS. 5A-5B are process flows depicting methods for determining a reward amount for a market participant according aspects of a market liquidity incentive system.

FIGS. 6-19 depict flow diagrams of exemplary embodiments of incentive determination processes of a market liquidity incentive system.

DETAILED DESCRIPTION

Figure 3:
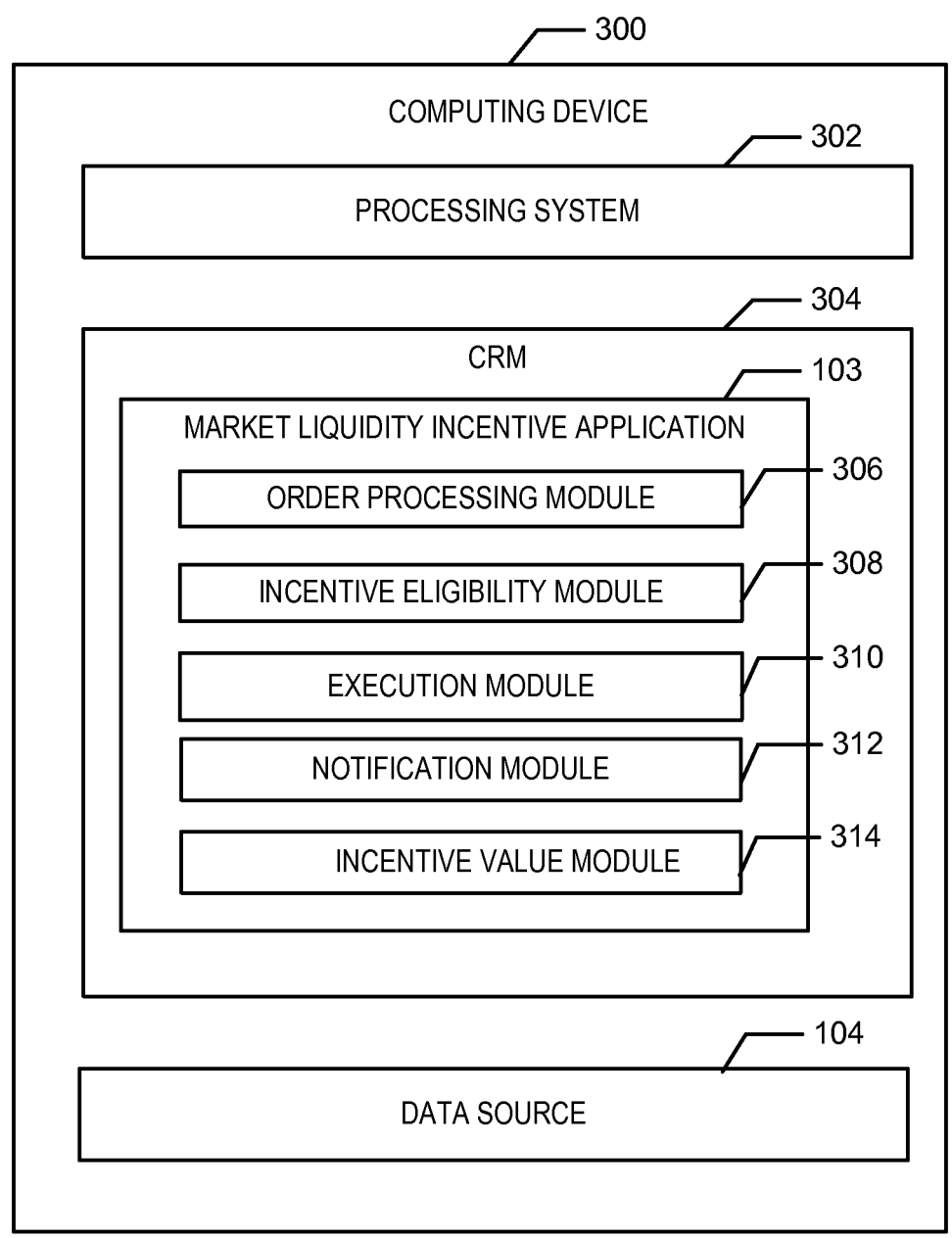
FIG. 3 is a block diagram of a computing device configured with a market liquidity incentive application according to one aspect of a market liquidity incentive system.

A financial exchange, such as an electronic financial trading exchange, receives one or more orders for one or more financial instruments. An order may include, for example, data indicating a financial instrument, an order side (for example, a buy side to buy or a sell side to sell), a price, and a number of shares. A share, as used herein, is a unit of ownership of a financial instrument and is not limited to a unit of ownership of a stock or equity. One or more other order data optionally may be included in an order, such as one or more order data identified with respect to FIG. 2 herein.

Data from one or more orders eligible for execution at a financial exchange generally is listed on the financial exchange's book. The financial exchange's book is information identifying bids to buy and offers to sell one or more financial instruments at the financial exchange that are eligible for execution but that have not executed. Unexecuted shares on the financial exchange's book are referred to herein as resting shares.

An exchange may have, for example, a continuous book for bids to buy and offers to sell a financial instrument at the exchange during regular trading hours, an auction book for bids to buy and offers to sell a financial instrument at the exchange during an auction (for example, an opening auction, a closing auction, an IPO auction, or another auction), an extended trading hours book for bids to buy and offers to sell a financial instrument at the exchange before and/or after regular trading hours, and/or another book for bids to buy and offers to sell a financial instrument at other times and/or at another exchange. The financial exchange alternately may have a continuous book for continuous orders (e.g. orders received for regular trading hours), an auction book for auction orders (orders received for an auction, for example, an opening auction, a closing auction, an IPO auction, or another auction), an extended trading book for orders for execution before and/or after regular trading hours, another book for other orders, or a book combining one or more of the foregoing.

A market liquidity incentive system (MLIS) provides an improved system and method for encouraging investors to increase the levels of liquidity in a financial market and/or to create tighter spreads between a best bid to buy a financial instrument and a best offer to sell the financial instrument in the financial market. An MLIS encourages quoting activity for financial instruments and incentivizes participants to provide liquidity. In one aspect, participants compete against each other to earn an incentive.

Aspects of an MLIS encourage investors to submit the largest amount of orders and/or the greatest aggregate number of shares in one or more orders for a financial instrument available in a financial market, such as at an electronic financial exchange. Other aspects encourage investors to submit the largest amount of orders and/or the greatest aggregate number of shares in one or more orders that are at a best bid to buy and/or best offer to sell for a financial instrument available in a financial market, such as at an electronic financial exchange. The MLIS may be used in any type of financial instrument market center environment (e.g., ETFs, securities, equities, futures, options, bonds, etc.). An aggregate number of shares is the total number of shares from one or more orders from a market participant. An aggregate number of resting shares is the total number of resting shares from one or more orders from a market participant.

In one aspect, the market liquidity incentive system selects market data for shares on the electronic financial exchange's book (e.g. resting shares), such as market data for one or more selected times or time points during a trading day or other period. The market data includes order data for resting shares, including the total number of resting shares from one or more orders of one or more financial instruments from each of one or more participants and the corresponding prices for the resting shares, and the best bids to buy and/or best offers to sell for the financial instruments. The market liquidity incentive system has a counter for each market participant. The count or value for the counter may, for example, start at zero or another value. For each selected time, the market liquidity incentive system analyzes the order data and the best bids to buy and best offers to sell (such as by comparing the order data for each market participant for the selected time) and increments a counter value of a participant's counter by a selected value for each market participant that has the greatest total number of resting shares from one or more orders for a particular financial instrument at the financial instrument's best bid to buy or best offer to sell. The market liquidity incentive system analyzes the counter values assigned to each market participant for a selected period, such as a trading day or other period, to determine the market participant that has the highest counter value in the selected period (such as by comparing the values of each market participant's counter), and selects the market participant that has the highest counter value in the selected period to be the market participant that has earned the incentive.

In another aspect, the market liquidity incentive system measures the total liquidity across a trading day, such as across all measured times during the trading day. The market liquidity incentive system selects market data for shares on the electronic financial exchange's book (e.g. resting shares), such as market data for one or more selected times during a trading day. The market data includes order data for resting shares, including the total number of resting shares from one or more orders of one or more financial instruments from each of one or more participants and the corresponding prices for the resting shares, and the best bids to buy and/or best offers to sell for the financial instruments. The market liquidity system has a counter for each market participant. The count or value for the counter may, for example, start at zero or another value. For each selected time, the market liquidity incentive system analyzes the order data and the best bids to buy and best offers to sell (such as by comparing the order data for each market participant for the selected time) and increments a counter value of a participant's counter by a selected value for each market participant that has the greatest total number of resting shares from one or more orders for a particular financial instrument at the financial instrument's best bid to buy or best offer to sell. In one example, the counter value is incremented by the total number of resting shares from the one or more orders from the market participant for the particular financial instrument that were at the financial instrument's best bid to buy or best offer to sell at that compared time increment. In another example, the counter value is incremented by a unit, such as by 1 (e.g. from 0 to 1, from 1 to 2, etc) or another unit. The market liquidity incentive system analyzes the counter values assigned to each market participant for a selected period to determine the market participant that has the highest counter value in the selected period (such as by comparing the values of each market participant's counter), such as a trading day, and selects the market participant that has the highest counter value in the selected period to be the market participant that has earned the incentive.

In another aspect, the market liquidity incentive system measures the total liquidity across a trading day for an aggregate best bid to buy and best offer to sell, instead of for a best bid to buy or best offer to sell. The aggregate best bid to buy and best offer to sell shares in this example is the total number of shares from a market participant at the best bid to buy plus the total number of shares at the best offer to sell. The market liquidity incentive system selects market data for shares on the financial exchange's book (e.g. resting shares), such as market data for one or more selected times during a trading day. The market data includes order data for resting shares, including the total number of resting shares from one or more orders of one or more financial instruments from each of one or more participants and the corresponding prices for the resting shares, and the best bids to buy and/or best offers to sell for the financial instruments. The market liquidity incentive system has a counter for each market participant. The count or value for the counter may, for example, start at zero or another value. For each selected time, the market liquidity incentive system analyzes the order data and the best bids to buy and best offers to sell (such as by comparing the order data for each market participant for the selected time) and increments a counter value of a participant's counter for each market participant that has the greatest total number of resting shares from one or more orders for a particular financial instrument at the financial instrument's best bid to buy and best offer to sell. In one example, the counter value is incremented by the total number of resting shares from the one or more orders from the market participant for the particular financial instrument that were at the financial instrument's best bid to buy and best offer to sell for the selected time. In another example, the counter value is incremented by a unit, such as by 1 (e.g. from 0 to 1, from 1 to 2, etc) or another unit. The market liquidity incentive system analyzes the counter values assigned to each market participant for a selected period to determine the market participant that has the highest counter value in the selected period (such as by comparing the values of each market participant's counter), such as a trading day, and selects the market participant that has the highest counter value in the selected period to be the market participant that has earned the incentive.

In another example, the market liquidity incentive system measures at each time increment during a trading period and for each of one or more financial instruments the aggregate number of shares from one or more orders for each of one or more market participants that are at the financial instrument's best bid to buy and/or best offer to sell.

In another example, the market liquidity incentive system measures at each of one or more time increments during a trading period, and for each of one or more financial instruments at each time increment, the aggregate number of shares from one or more orders at the electronic financial exchange for each of one or more market participants that are at the financial instrument's best bid to buy and/or best offer to sell at each compared time increment. In this example, the market liquidity incentive system measures aggregated buy side and sell side orders for each financial instrument of the system (e.g. displayed at, traded at, executed at, or selected to participate in an incentive at the electronic financial exchange) to determine one or more market participants that have the greatest aggregate number of shares at each of one or more compared time increments and determine the total number of time increments during the trading period each market participant has the greatest aggregate number of shares. The market liquidity incentive system selects the market participant having the greatest total number of time increments during the trading period that the market participant has the greatest aggregate number of shares to receive (as having earned) an incentive and applies the incentive to the selected market participant, such as to the market participant's account. In this example, one or more market participants can win each time increment.

In another example, the market liquidity incentive system measures at each of one or more times (for example, time increments) during a trading period, and for each of one or more financial instruments at each time increment (for example, time increments), the aggregate number of shares at the electronic financial exchange from one or more orders for each of one or more market participants that are at the financial instrument's best bid to buy or best offer to sell at each compared time increment. In this example, the market liquidity incentive system measures aggregated buy side and sell side orders for each financial instrument of the system (e.g. displayed at, traded at, executed at, or selected to participate in an incentive at the electronic financial exchange) to determine one or more market participants that have the greatest aggregate number of shares at each of one or more compared times (for example, time increments) at the best bid to buy or best offer to sell and determine the total number of times (for example, time increments) during the trading period each market participant has the greatest aggregate number of shares. The market liquidity incentive system selects the market participant having the greatest total number of times (for example, time increments) during the trading period that the market participant has the greatest aggregate number of shares at the best bid to buy or best offer to sell to receive (as having earned) an incentive and applies the incentive to the selected market participant, such as to the selected market participant's account. In this example, the market liquidity incentive system measures aggregated buy side and/or sell side orders for each financial instrument of the system.

In another example, the market liquidity incentive system measures at each of one or more time increments during a trading period, and for each of one or more financial instruments at each time increment, the aggregate number of shares from one or more orders for each of one or more market participants that are at the financial instrument's best bid to buy and best offer to sell at each compared time increment. In this example, the market liquidity incentive system measures aggregated buy side and sell side orders for each financial instrument of the system (e.g. displayed at, traded at, executed at, or selected to participate in an incentive at the electronic financial exchange) to determine one or more market participants that have the greatest aggregate number of shares at each of one or more compared time increments at the best bid to buy and best offer to sell and determine the total number of time increments during the trading period each market participant has the greatest aggregate number of shares. The market liquidity incentive system selects the market participant having the greatest total number of time increments during the trading period that the market participant has the greatest aggregate number of shares at the best bid to buy and best offer to sell to receive (as having earned) an incentive and awards, issues, or applies the incentive to the selected market participant, such as to the selected market participant's account. In this example, the market liquidity incentive system measures aggregated buy side and sell side orders for each financial instrument of the system.

In another example, the market liquidity incentive system measures at each of one or more time increments during a trading period, and for each of one or more financial instruments at each time increment, the aggregate number of shares from one or more orders at an electronic financial exchange for each of one or more market participants that are at the financial instrument's best bid to buy at each compared time increment. In this example, the market liquidity incentive system measures aggregated buy side and sell side orders for each financial instrument of the system (e.g. displayed at, traded at, executed at, or selected to participate in an incentive at the electronic financial exchange) to determine one or more market participants that have the greatest aggregate number of shares at each of one or more compared time increments at the best bid to buy and determine the total number of time increments during the trading period each market participant has the greatest aggregate number of shares. The market liquidity incentive system selects the market participant having the greatest total number of time increments during the trading period that the market participant has the greatest aggregate number of shares at the best bid to buy to receive (as having earned) an incentive and applies the incentive to the market participant, such as to the market participant's account. In this example, the market liquidity incentive system measures aggregated buy side orders for each financial instrument of the system. In one aspect of this example, sell side orders optionally are not analyzed for the purpose of determining aggregate number of buy side shares. In another aspect of this example, sell side orders optionally are not analyzed for the purpose of determining aggregate number of buy side shares except to identify quotes or their existence for the various orders.

In another example, the market liquidity incentive system measures at each of one or more time increments during a trading period, and for each of one or more financial instruments at each time increment, the aggregate number of shares from one or more orders at the electronic financial exchange for each of one or more market participants that are at the financial instrument's best offer to sell at each compared time increment. In this example, the market liquidity incentive system measures aggregated buy side and sell side orders for each financial instrument of the system (e.g. displayed at, traded at, executed at, or selected to participate in an incentive at the electronic financial exchange) to determine one or more market participants that have the greatest aggregate number of shares at each of one or more compared time increments at the best offer to sell and determine the total number of time increments during the trading period each market participant has the greatest aggregate number of shares. The market liquidity incentive system selects the market participant having the greatest total number of time increments during the trading period that the market participant has the greatest aggregate number of shares at the best offer to sell to receive (as having earned) an incentive and applies the incentive to the market participant, such as to the market participant's account. In this example, the market liquidity incentive system measures aggregated sell side orders for each financial instrument of the system. In one aspect of this example, buy side orders optionally are not analyzed for the purpose of determining aggregate number of sell side shares. In another aspect of this example, buy side orders optionally are not analyzed for the purpose of determining aggregate number of sell side shares except to identify quotes or their existence for the various orders.

A selected time may be a time, for example, a time point, a time increment, an event, or another selected time. In one example, one or more selected times are time increments. In another example, the one or more selected times are one-second time increments. In another example, one or more selected times are one or more times during a trading day. One or more selected times alternately may be one or more randomized times or one or more non-randomized times. A combination of one or more of the foregoing may be used.

The selected period may be, for example, a trading day (including regular hours only, extended trading hours, auction hours, or a combination of one or more of the foregoing), a week with one or more trading days, a month with one or more trading days, an hour, multiple hours, another period of time, a period with respect to trades, or events, or another period.

In another aspect, the MLIS limits the analysis to order data for one or more selected financial instruments and BBO data (best bid to buy data and/or best offer to sell data) for the selected financial instruments.

In one example, the market liquidity system selects and analyzes the market data at the one or more selected times during the selected period. In another example, the market liquidity system selects and analyzes the market data for the one or more selected times, not necessarily at the one or more selected times and not necessarily during the selected period. In another example, the market liquidity trading system analyzes the counter values for each market participant for the selected period, not necessarily at or during the selected period.

In still another example, the MLIS analyzes order data and BBO data for only best bids to buy. In still another example, the MLIS analyzes order data and BBO data for only best offers to sell.

In still another aspect, the MLIS analyzes only order data from orders displayed (or, alternately, displayable) at the exchange for the MLIS for the incentive determination. A displayable order is an order or a portion of another order that will be visible as a trading interest, such as on the electronic financial exchange or other financial market based on a current BBO. A non-displayable order is an order or a portion of another order that is not or will not be visible as a trading interest, such as on the electronic financial exchange or other financial market.

In another aspect, the market liquidity incentive system selects market data for shares on the electronic financial exchange's book (e.g. resting shares), such as market data for a selected time point. The market data includes order data for resting shares, including the number of resting shares from one or more orders of one or more financial instruments from each of one or more participants and the corresponding prices for the resting shares, and financial instruments BBO data. Financial instrument BBO data includes data identifying the best bid to buy for a financial instrument and/or the best offer to sell for the financial instrument or such data for multiple financial instruments. The market liquidity system has a counter for each market participant. The count or value for the counter may, for example, start at zero or another value. The market liquidity system analyzes the order data and the best bids to buy and best offers to sell (such as by comparing the order data for each participant) and increments a counter value for each market participant that has the greatest total number of resting shares from one or more orders for a particular financial instrument at the financial instrument's best bid or best offer for that selected point in time. The market liquidity incentive system optionally selects market data for the financial exchange for one or more additional points in time during a trading day, analyzes the order data and the BBO data for each additional point in time (such as by comparing the order data for each participant), and increments a counter value for each market participant that has the greatest total number of resting shares from one or more orders for a financial instrument at the best bid or best offer. The market liquidity incentive system analyzes the values of the counter assigned to each market participant to each other for a selected period (such as by comparing the values of each market participant's counter to the values of each other market participant's counter), such as a trading day or other period, and selects the market participant that has the highest counter value in the selected period to be the market participant that has earned the incentive.

A parameter, such as an event parameter, may be used in place of a counter in one or more aspects herein, including in the aspects and examples described herein. A parameter is a variable or storage that has or holds a value. Thus, the market liquidity incentive system may increment an event parameter by a value or assign or otherwise store a value to the event parameter for a market participant instead of incrementing a counter value for the market participant. The value for the parameter may, for example, start at zero or another value.

For example, the market liquidity incentive system has an event parameter for each market participant. The market liquidity incentive system analyzes the order data and the best bids to buy and best offers to sell and increments an event parameter value of a market participant's event parameter for each market participant that has the greatest total number of resting shares from one or more orders from a particular market participant for a particular financial instrument at the financial instrument's best bid to buy and/or best offer to sell. In one example, the event parameter value is incremented by the total number of resting shares from the one or more orders for the particular financial instrument that were at the financial instrument's best bid to buy and/or best offer to sell for the selected time. In another example, the event parameter value is incremented by a unit, such as by 1 (e.g. from 0 to 1, from 1 to 2, etc) or another unit. The incentive system analyzes the event parameter values assigned to each market participant for a selected period to determine the market participant that has the highest event parameter value in the selected period (such as by comparing the values of each market participant's event parameter), such as a trading day, and selects the market participant that has the highest event parameter value in the selected period to be the market participant that has earned the incentive.

In one aspect, the market liquidity incentive system compares an aggregate number of shares of a financial instrument resting on the exchange's book from each of one or more market participants to a best bid or best offer for the financial instrument. The aggregate number of shares is the total number of shares from one or more orders. Resting shares are shares from or in orders on the financial exchange's book. Resting shares alternately may be called pending shares.

The market liquidity incentive system increments a count or value of an event parameter assigned to the market participant that has the greatest number of resting shares at the best bid or best offer at a selected time (alternately, when the comparison is made). The value for the parameter may, for example, start at zero. The market liquidity incentive system analyzes the parameter value assigned to each market participant for a selected period (such as by comparing the parameter values for each market participant) and selects the market participant that has the greatest event parameter value (for example, the highest value in the event parameter) in the selected period to be the market participant that has earned the incentive.

In another aspect, the market liquidity incentive system analyzes the aggregate number of resting shares of a financial instrument from one or more market participants on the electronic financial exchange's book to a best bid or best offer for the financial instrument, such as by comparing the aggregate number of resting shares of a financial instrument for each market participant. The market liquidity incentive system assigns a unit of value to the market participant that has the greatest number of resting shares at the best bid and assigns a unit of value to the market participant that has the greatest number of resting shares at the best offer when the analysis is made. The market liquidity incentive system analyzes the number of units assigned to each market participant for a selected period, such as by comparing the number of units assigned to each market participant for the selected period. The market liquidity incentive system selects the market participant that has the greatest number of units in the selected period to be the market participant that has earned the incentive.

In another aspect, the market liquidity incentive system analyzes the aggregate number of resting shares of a financial instrument from one or more market participants on the electronic financial exchange's book to a best bid or best offer for the financial instrument, such as by comparing the aggregate number of resting shares of a financial instrument for each market participant. The market liquidity incentive system assigns a unit of value to the market participant that has the greatest number of resting shares at the best bid and best offer when the analysis is made. The market liquidity incentive system analyzes the number of units assigned to each market participant for a selected period, such as by comparing the number of units assigned to each market participant for the selected period. The market liquidity incentive system selects the market participant that has the greatest number of units in the selected period to be the market participant that has earned the incentive.

In another aspect, the best bid is the current best bid for the financial instrument, and the best offer is the current best offer for the financial instrument.

In another aspect, the market liquidity incentive system performs one or more size event tests (SETs). A SET is a determination by the market liquidity incentive system of the aggregate order size of each financial instrument for each participant and the BBO data for each financial instrument. The aggregate order size is the total number of shares submitted by a participant in one or more orders and that are resting on the electronic financial exchange's book at a selected time. The BBO data includes data identifying the best bid to buy for a financial instrument and/or the best offer to sell for the financial instrument or such data for multiple financial instruments. A SET result identifies a particular participant as being eligible for a reward or other incentive based on the aggregate order size of orders submitted by that particular participant that include eligible order prices at a best bid to buy and/or a best offer to sell. A participant earns (or wins) a SET when it has the greatest aggregate number of shares in one or more orders that are resting on the exchange's book for a selected time at a best bid to buy the financial instrument and/or a best offer to sell the financial instrument for the selected time.

A SET is performed at one or more test times or test periods. An incentive is awarded by the market liquidity incentive system or electronic financial exchange to the participant that earns (or wins) the most SETs during a selected period, such as an hour, day, week, month, a trading period, or other period.

For example, a test time may be a time point, a time increment, event, or another selected time. In one example, one or more test times are time increments. In another example, the one or more test times are one-second time increments. In another example, one or more test times are one or more times during a trading day. One or more test times alternately may be one or more randomized times or one or more non-randomized times. A combination of one or more of the foregoing may be used.

A selected period may be, for example, a trading day (including regular hours only, extended trading hours, auction hours, or a combination of one or more of the foregoing), a week with one or more trading days, a month with one or more trading days, an hour, multiple hours, another period of time, a period with respect to trades, or events, or another period. In one example, a selected period is a trading day, and a test time for the test is each second of the trading day.

In another example, round lots are counted toward the participant's aggregated size. In still another example, a participant must win at least ten percent of the SETs each day to qualify for the incentive.

In one aspect, the incentive is a reward. In one example of this aspect, two participants may receive the reward each day. In one example, the top winner receives a larger percentage of the reward, and the second-place winner receives the remaining percentage of the reward. In the event of a tie in another example, the participant with the most executed shares wins the SET. In the event of a tie in another example, two or more participants that tie win the SET.

According to an aspect, the MLIS periodically compares a quoted price for a particular financial instrument to a current best bid or offer (BBO) for the financial instrument in the market and uses one or more incentive rules to determine if that particular order is eligible for an incentive, such as a financial reward or other incentive, for example, when the price of the financial instrument in the order is at (e.g. matches) the BBO. The MLIS may then determine whether a particular investor or market participant is eligible to receive an incentive based on the number of eligible orders submitted and/or the aggregate order size based on the one or more incentive rules. The aggregate order size is the total amount of shares submitted by the participant in one or more orders during a selected period or at a selected point in time. The MLIS may also determine the particular incentive, such as an amount of a financial reward, for that particular order, using one or more incentive rules.

According to another aspect, the MLIS determines if a particular market participant is eligible for a reward or other incentive based on daily and/or monthly quoting requirements. In this aspect, a particular market participant that does not satisfy monthly quoting requirements may be subjected to penalties or disqualified from receiving incentives. Although one type of incentive provided to market participants is referred to herein as a reward, it should be understood that the reward could be in the form a rebate, credit, or other incentive. Similarly, an incentive may be a reward, rebate, credit, or other incentive.

FIG. 1A depicts an exemplary financial exchange computing system 10, such as for an electronic financial exchange, that includes an MLIS 100 in accordance with aspects of the disclosure. The MLIS 100 includes a server (local server) 102 or other computer or computing device or system that includes a market liquidity incentive application (MLIA) 103 and a data source 104. A server, a computer, and a computing device are examples of computing hardware. A processor is another example of hardware. Hardware is a physical device.

The MLIS 100 receives one or more orders, order information, and/or other data and/or communications from one or more remote computing devices (remote device) (e.g., remote device #1-#N) 106 or other computer systems or devices via a communication network 112. The MLIS 100 transmits order information (such as information for executed orders, reward or other incentive data, or payment information) and/or other data and/or communications to the computing devices (e.g., remote device #1-#N) 106 or other computer systems or devices via the communication network 112.

The MLIS 100 transmits orders, order information, market data, incentive data, and/or other data and/or communications to a Security Information Processor (SIP) system 110 and receives orders, order information, market data, incentive data, and/or other data and/or communications from the SIP system.

The local server 102 is associated with a financial exchange, such as a local financial exchange, and is configured to receive orders, order data, incentive data, and/or other data and/or communications from and/or transmit orders, order data, incentive data, and/or other data and/or communications to the one or more remote devices 106 through a communication network 112. The local server 102 includes one or more processors and volatile and/or non-volatile memory and executes the MLIA 103, such as to determine orders that are eligible for a reward or other incentive and to determine a reward amount or other incentive type or value. Examples of a local server 102 include one or more servers, personal computers, mobile computers and/or other mobile devices, and other computing devices. The local server 102 communicates via wireless and/or wireline communications.

The local server 102 receives data and/or communications from and/or transmits data and/or communications to the SIP system 110, such as directly or through a communication network.

According to one aspect, the local server 102 includes a client communication interface (not shown). The client interface provides a port for one or more remote devices 106 to enable point-to-point communications between the local server 102 and a particular remote device 106 connected to that port or point-to-multipoint communications between the server and multiple remote devices connected to one or more ports. As a result, each of the multiple remote devices 106 can be connected to the client interface via a different port in one embodiment. The port optionally may be a dedicated port.

Optionally, the local server 102, or the MLIA 103 executing on the local server 102, periodically stores and/or aggregates orders, order data, market data, incentive data, and/or other data. The local server 102, for example, receives consolidated BBO information identifying a BBO, receives raw order data from which it calculates a BBO, and/or uses order information for financial instruments executing on an exchange from which it calculates a BBO (alone or in combination with other data). The local server 102 optionally stores order data for orders displayed to and/or executed on the exchange in an exchange book and optionally stores BBO information and/or other market data, for example, in a consolidated book table.

The data source 104 stores order information (data), market information (data), incentive information (data), and/or other data. For example, according to one aspect, the data source 104 stores order detail data (described below) for each order received at the local server 102 from the one or more remote devices 106. The data source 104 may also store order data, market data, incentive data, and other data received from the SIP system 110.

Although the data source 104 is shown as being located on, at, or within the local server 102, it is contemplated that the data source 104 can be located remotely from the local server 102 in other aspects of the MLIS 100, such as on, at, or within a database of another computing device or system having at least one processor and volatile and/or non-volatile memory.

The remote devices 106 each have one or more processors and volatile and/or non-volatile memory. Examples of a remote device 106 include one or more personal computers, mobile computers and/or other mobile devices, and other computing devices. The remote devices 106 each communicate via wireless and/or wireline communications.

The remote servers 108 each have one or more processors and volatile and/or non-volatile memory. Examples of a remote server include one or more servers, personal computers, mobile computers, and/or other mobile devices, and other computing devices. The remote servers 108 each communicate via wireless and/or wireline communications.

The SIP system 110 transmits orders, order information, market data, incentive data, and/or other data to one or more remote exchange servers (e.g., remote servers #1-#N 108) via a communication network 116 and/or to the local server 102. The SIP system 110 also receives orders, order information, incentive data, market data, and/or other data from one or more remote exchange servers (e.g., remote servers #1-#N 108) via the communication network and/or to the local server 102.

The communication networks 112, 116 can be can be the Internet, an intranet, and/or another wired and/or wireless communication network. In one aspect, one or more of the local server 102, the remote devices 106, the remote server 108, and/or the SIP system 110 communicate data in packets, messages, or other communications using a Financial Information Exchange (FIX) protocol, which is a protocol commonly used to exchange financial information. In another aspect, one or more of the local server 102, the remote devices 106, the remote servers 108, and/or the SIP system 110 exchange data using other protocols (alone or in connection with the FIX protocol), such as a Hypertext Transfer Protocol (HTTP) or a Wireless Application Protocol (WAP). Other examples of communication protocols exist.

FIG. 1B depicts an exemplary embodiment of a remote device 106 according to one aspect of the financial exchange computing system 10. The remote device 106 is a computing or processing device that includes one or more processors and memory and is configured to receive data and/or communications from, and/or transmit data and/or communications to, the local server 102 via the communication network 112. For example, the remote device 106 can be a laptop or notebook computer, a personal digital assistant, a tablet computer, standard personal computer, or another processing device. The remote device 106 includes a display 120, such as a computer monitor, for displaying data and/or graphical user interfaces. The remote device 106 may also include an input device 122, such as a keyboard or a pointing device (e.g., a mouse, trackball, pen, or touch screen) to enter data into or interact with graphical user interfaces.

Each remote device 106 may also include a graphical user interface (or GUI) application 124, such as a browser application, to generate a graphical user interface 126 on the display 120. The graphical user interface 126 enables a user of the remote device 106 to view market data and other data for a particular financial instrument received from the local server 102 or other servers or devices throughout the trading day and to view incentive data and other data.

According to another aspect, a user uses the graphical user interface 126 to enter an order for a particular financial instrument and submit the order to the MLIS 100. Each order includes order detail data, such as an instrument identifier for the financial instrument, a quantity of the particular financial instrument, an order price, an order side, a particular order type, a market participant identification, a member identification, or other participant identification, optional date and/or time of the order, and/or other order data. The order side identifies whether the order is a buy order or a sell order. The instrument identifier ("instrument ID") is a name, symbol, or other identifier for the financial instrument (e.g., stock/equity/ETF symbol). The market participant identification ("MPID") is a unique identifier that is assigned to a market participant that is eligible to access one or more market exchanges via a trading system associated with a particular market exchange. The order price is the price of the bid or offer for the financial instrument (examples of which include a selected price, limit price, stop price, market price, etc.). The order type identifies whether the order is, for example, a regular market order, a limit order, a regular on-open (ROO) order, a regular-on-close (ROC) order, a limit-on-open (LOO) order, a limit-on-close (LOC) order, a late-limit-on-open (LLOO) order, a late-limit-on-close (LLOC) order, or a regular hours only (RHO) order.

According to one aspect, the user uses the graphical user interface 126 to enter an order in a format that is supported, receivable, transmittable, and/or processable by the MLIS 100 (e.g. the local server 102 of the MLIS). According to one aspect, the message format for the order is in a FIX message format. Though, other formats may be used. In one example, an order in a FIX message format includes a number of fields that each corresponds to a tag value pairing that is separated from the next field by a delimiter. The tag is a string, integer, or other representation of a value that indicates the meaning of the field. The value holds a specific meaning for the particular tag.

FIG. 2 is an example of a table 200 that depicts information for various tags and corresponding fields for an example order 200 for a financial instrument in a FIX format. Though other message formats may be used, including for FIX-type messages and/or other messages. In this example, an order type tag 40 corresponds to an order type, a price tag 44 corresponds to a price (for example, buy price or sell price), a participant ID tag 49 may correspond to the market participant ID, an order side tag 54 corresponds to an order side (for example, buy or sell), an instrument ID tag 55 corresponds to the instrument ID of the financial instrument, and a security type tag 167 corresponds to a security type. Other orders in a FIX message may include additional and/or other tags that are not shown in FIG. 2.

Referring now to FIG. 1C, an exemplary embodiment of the data source 104 is depicted according to one aspect of the MLIS 100. The data source 104 is, for example, a database that stores order records 130 for one or more orders received at the local server 102 from the one or more remote devices 106. For example, the data source 104 stores a local book table 128 that includes one or more order records 130 for one or more orders displayed at the local server 102. Each order record 130 includes corresponding order detail data. The order records 130 may also include a flag or other indicator value or attribute for each received order that indicates whether the order is at (e.g. equal to) a BBO for the selected time or test time. (A BBO for, or corresponding to, the selected time for which the MLIS selects order data and/or market data for analysis and/or comparison or the test time is referred to herein as a current BBO.) As described in more detail below, the flag or other indicator value or attribute can be a code, symbol, integer, flag value, 0, 1, or other attribute. Table 1 below depicts exemplary order detail data included in order records 130 stored in a local data source 104. Order records can include other order detail data, such as other data from a FIX message, including data identified in FIG. 2, such as order date and time.

TABLE 1

| ORDER NO | Order side | Order Type | Order Quantity (Size) | Price | Instrument ID | Equal to BBO | Market Participant ID (MPID) | Execution Status |
|---|---|---|---|---|---|---|---|---|
| 1 | BUY | Limit | 5000 | 27.75 | IFEU | Y | ABC | Executed |
| 2 | SELL | Market | 3000 | 42.00 | USO | N | ACE | Open |
| 3 | SELL | LOC | 2500 | 12.50 | GSG | N | BCD | Open |
| 4 | BUY | Limit | 10000 | 30.15 | EWD | Y | EFGS | Executed |
| N | BUY | Limit | 7500 | 15.50 | EWO | N | XYZ | Cancelled |

In this example, Table 1 includes order detail data, such as order side, order type, instrument ID, and order quantity (size), for each of a plurality of order records 1-N. Table 1 also includes a flag attribute value and an execution status for each of a plurality of order records 1-N. It is contemplated that the local book table 128 optionally may include other order detail data and/or other market data, such as whether or not the order is displayable.

In other aspects, it is contemplated that the data source 104 is a memory that stores order detail data for one or more orders received at the local server 102 from the one or more remote devices 106. For example, the data source 104 is a random access memory (RAM) of the local server 102 in one aspect.

According to another aspect, the data source 104 stores one or more incentive rules for processing orders. Incentive rules, for example, define one or more constraints that can be used to determine if an order is eligible for an incentive and to determine the value of the incentive, such as a reward and an amount of the reward. In this example, the data source 104 stores order eligibility rules 132, participant eligibility rules 133, incentive value rules 134, and/or other incentive rules, incentive data, and market data 136. The order eligibility rules 132, participant eligibility rules 133, incentive value rules 134, and/or other incentive rules each include one or more rules.

The order eligibility rules 132 include one or more rules are used to determine whether a particular order received by the MLIA 103 is eligible for an incentive, such as a reward. According to one aspect, the order eligibility rules 132 define orders that are eligible for a reward or other incentive that include an order price that is equal to a current BBO.

An example of a BBO is the national best bid or offer (NBBO). The NBBO, for example, includes prices from one or more market centers (i.e. exchanges), and refers to the price at the time of entry into the market. For example, the NBBO provides investors the best available buy price or the best available sell price for available securities.

According to one aspect, the NBBO is generated by a consolidated entity (e.g. consolidated tape) and received by a Securities Information Processor (e.g., SIP system 110). The SIP system 110 then forwards the NBBO to the MLIS 100.

In another aspect, the SIP system 110 receives BBO information (for example, raw information for orders) from one or more exchanges. The SIP system 110 transmits that BBO information to the MLIS 100 or MLIA 103, and the MLIS 100 or MLIA 103 calculates the BBO. Optionally, the MLIS 100 or MLIA 103 records the calculated BBO in a consolidated book table 118. Thereafter, the MLIS 100 or MLIA 103 can retrieve market data 136, including the BBO, from the consolidated book table for storage in the data source 104.

In another aspect, the MLIS 100 or MLIA 103 receives BBO information directly from one or more exchanges. The MLIS 100 or MLIA 103 calculates the BBO. Optionally, the MLIS 100 or MLIA 103 records the calculated BBO in a consolidated book table 118. Thereafter, the MLIS 100 or MLIA 103 can retrieve market data 136, including the BBO, from the consolidated table for storage in the data source 104.

According to another aspect, the BBO is generated by the server associated with an individual exchange (e.g., local server 102). In this aspect, the local server 102 is configured to retrieve or receive market data from one or more other exchanges and to determine the BBO at any given time. For example, the local server 102 may be configured to immediately calculate the BBO for a particular financial instrument upon receiving an order for that particular financial instrument.

In another example, the SIP system 110 receives BBO information from one or more exchanges and calculates the BBO. The SIP system 110 transmits the BBO to the MLIS 100 or MLIA 103.

Another example of a BBO is a local best bid or offer (LBBO). The LBBO refers to the best bid or offer on the order book associated with a particular exchange of the MLIS 100 at the time of entry into the market. The LBBO provides investors the best available sell price and/or the best available buy price for a particular financial instrument on that particular exchange at a particular time. In one example, the LBBO is based only on orders displayed (or, alternately, displayable) at the local exchange.

In another example, the local server 102 calculates a BBO (such as an LBBO) based on order data received at and/or displayed at an exchange of the local server 102. In another example, the local server 102 calculates a BBO (such as an LBBO) based on orders executed at an exchange of the local server 102. In another example, the local server 102 calculates a BBO based on order data received and/or displayed and/or executed at an exchange of the server 102 and order data and/or other data received from (originating from) one or more other exchanges.

In another example, a BBO is determined by a local server 102 based on a combination of one or more methods described above.

The BBO for a particular financial instrument can change during the trading day as orders are received to buy and/or sell that financial instrument at prices that are more aggressive than, the same as, or less aggressive than the current BBO.

According to one aspect, the order eligibility rules 132 define orders that are eligible for a reward or other incentive that are displayable and include a display price for a financial instrument that is equal to a current BBO. A displayable order is an order or a portion of another order that will be visible as a trading interest to a market, such as on the exchange or other financial market based on the current BBO. A non-displayable order is an order or a portion of another order that is not or will not be visible as a trading interest to a market, such as on the exchange or other financial market.

An example of a non-displayable order is a hidden order. A hidden order is an order marked as not visible to the market. A hidden order can execute. However, the hidden order is not visible or otherwise made available to the market until after it executes, if at all. Unless and until the hidden order executes, it is only visible to the exchange to which it is directed, not to the market. The MLIS 100 (i.e. local server 102 or MLIA 103 executing on the local server) determines if an order is a hidden order. A participant designates an order as hidden or not, such as upon entry or submission to an exchange, other market participant, or other financial market.

Another example of a non-displayable order (at least as to the exchange to which the order was directed upon entry) is an order that requires routing. For example, the order may require routing to another exchange or financial market when the order is executed at the other exchange or financial market based on the order price, such as when the order price locks or crosses a best bid or best offer price. In one example, a participant designates an order as routable or not, such as upon entry or submission to an exchange, other market participant, or other financial market. The MLIS 100 (i.e. local server 102 or MLIA 103 executing on the local server) determines whether or not to route an order and, if routable, how the order is to be routed. A routable order can be routed to another exchange or other financial market.

According to another aspect, the participant eligibility rules 133 include one or more rules that are used by the MLIS 100 to determine whether a particular market participant that has submitted one ore orders received by the MLIA 103 is eligible for a reward. For example, the participant eligibility rules 133 are used to determine whether the particular market participant is eligible for a reward based on the order size of one or more orders submitted by that particular market participant that each includes an order price that is at least equal to a current BBO. According to one aspect, the particular market participant is an eligible member or registered market maker of a particular exchange, such as a competitive liquidity provider (CLP).

CLPs are, for example, members of an exchange that enter orders for a financial instrument into the MLIS 100 and are obligated to maintain a bid or an offer at the BBO for one or more assigned financial instruments in accordance with CLP quoting requirements. Examples of CLP quoting requirements include a daily quoting requirement of submitting orders that win a certain amount/percentage of size event tests (SETs, as described herein) during a trading day and/or a monthly quoting requirement of submitting orders that win a certain amount/percentage of size event tests during a particular month. Other examples of CLP quoting requirements exist.

According to one aspect, the participant eligibility rules 133 are used by the MLIS 100 to identify a particular market participant of multiple market participants that has submitted the most orders or greatest aggregate order size of orders that include an eligible order price (e.g., an order price for a financial instrument that is equal to the current BBO for the instrument) at a selected time (e.g., second, minute, hour, day, week, month, etc.). For example, if a first market participant submits three separate orders for one or more financial instruments that each include an eligible order price during a selected time, and a second market participant submits four separate orders for the same and/or other financial instruments that include an eligible order price during the same selected time, the MLIS 100 will determine that the second market participant is eligible for the reward or other incentive.

According to another aspect, in addition to determining eligibility for a reward or other incentive based on the number of orders received from a particular member that each include an eligible order price, the participant eligibility rules 133 may further determine eligibility from the particular member as being eligible for a reward or other incentive based on an order quantity data (such as trade volume) associated with the one or more orders received from the participant. For example, referring again to the first and second market participants discussed above, the participant eligibility rules 133 may require determining a volume parameter associated with each order received from the first and second participants occurring over a selected period (e.g., second, minute, hour, day, week, month, etc.) and comparing the total volumes associated with each order from the first and second market participants that include an eligible order price. Thereafter, a reward or reward eligibility (or other incentive and incentive eligibility) is assigned to a particular market participant or member (member ID) based on the comparison. For example, if a first market participant submits three separate orders for one or more financial instruments that each include an eligible order price at a selected time and has an aggregate order size of 3000, and a second market participant submits four separate orders for the same and/or other financial instruments that include an eligible order price at the same selected time and has an aggregate order size of 2800, the MLIS 100 will determine that the first market participant is eligible for the reward or other incentive.

The incentive value rules 134 include one or more rules that are used to determine an incentive value, such as an amount of a reward or other incentive value, for an order that is eligible for an incentive. In another aspect, the incentive value rules 134 define a reward amount for a reward or other incentive value of an incentive based on the number of eligible orders or aggregate order size of orders that have been executed on the behalf of a particular market participant for a selected time period (e.g., minute, hour, day, week, month, etc.) Other examples of incentive value rules 134 exist.

According to other aspects, the incentive value rules 134 are used to determine or assign other rewards or incentives to or for market participants. For example, market participants that submit orders for one or more financial instruments that earn two daily award amounts or incentive values during a month qualify for free executions in auctions for those one or more financial instruments during the following month.

FIG. 3 is a block diagram depicting an exemplary MLIA 103 executing on a computing device 300. According to one aspect, the computing device 300 includes a processing system 302 that includes one or more processors or other processing systems or devices and optionally volatile and/or non-volatile memory. The processing system 302 executes the MLIA 103 to process order data to determine if one or more orders and/or an aggregate order size and/or one or more market participants are eligible for an incentive and, if eligible, a value for the incentive. For example, the processing system 302 executes the MLIA 103 to process order data received from one or more remote computing devices (not shown) to determine if one or more orders and/or an aggregate order size and/or one or more market participants are eligible for an incentive and, if eligible, a value for the incentive.

According to one aspect, the computing device 300 includes a computer readable medium ("CRM") 304 configured with the MLIA 103. The MLIA 103 includes machine/computer readable/executable instructions or modules that are executable/executed by the processing system 302 to determine if an order is eligible for an incentive, determine if an aggregate order size is eligible for an incentive, determine if a market participant is eligible for an incentive, and/or determine an amount of a reward or value of an incentive for a market participant.

The CRM 304 may include volatile media, nonvolatile media, removable media, non-removable media, and/or another available medium that can be accessed by the computing device 300. By way of example and not limitation, the CRM 304 comprises computer storage media and communication media. Computer storage media includes nontransient memory, volatile media, nonvolatile media, removable media, and/or non-removable media implemented in a method or technology for storage of information, such as computer/machine readable/executable instructions, data structures, program modules, or other data. Communication media may embody computer/machine readable/executable instructions, data structures, program modules, or other data and include an information delivery media or system. For example, the MLIA 103 is loaded or stored on the CRM in one example.

An order processing module 306 receives an order, such as from a remote computing device (e.g., remote device 106) or other computing device. As described above, the user of the remote device interacts with the input device 122 to enter an order, which may be transmitted in, for example, a FIX message format or other format. The order processing module 306 identifies order detail data included in the received order. For example, the order processing module 306 processes the order, in the FIX message format or other format, to determine one or more of an instrument, an MPID, an order side (i.e., buy order or sell order), a quantity, a price, and an order type. The order processing module 306 then optionally stores the order detail data in the data source 104.

An incentive eligibility module 308 retrieves one or more order eligibility rules 132 and market data 136 from the data source 104 in response to the received order. The incentive eligibility module 308 processes the order detail data and the BBO data or other market data according to the order eligibility rules 132 to determine if the order is eligible for a reward or other incentive. In one example, the order eligibility rules 132 include a first set of one or more order eligibility rules and a second set of one or more order eligibility rules.

The incentive eligibility module 308 processes the order detail data and market data according to the first set of order eligibility rules 132 to determine if the order is eligible for a reward or other incentive based on a price in the order. For example, the incentive eligibility module 308 retrieves BBO data (such as a current BBO) from the data source 104 and compares the order price for the particular financial instrument to the current BBO parameters (for example, best buy price and/or best sell price) to determine if the order price for the order is equal to the current BBO. In this example, the incentive eligibility module 308 determines that the order is eligible for a reward or other incentive when the order price is equal to the current BBO.

According to another aspect, the incentive eligibility module 308 further processes the order detail data according to a second set of order eligibility rules 132 to determine if the order is eligible for a reward or other incentive based on an order price and an order size. The second set of order eligibility rules 132 determines if the order size for the particular financial instrument corresponds to a round lot size (e.g., a number of shares evenly divisible by 100 shares.) In this example, the incentive eligibility module 308 determines that the order is eligible for a reward or other incentive when the order price is equal to the current BBO and the order size for the particular financial instrument corresponds to a round lot size.

According to another aspect, the incentive eligibility module 308 retrieves order eligibility rules 132 and BBO data (e.g., a current BBO) from the data source 104, processes the order price and/or order size from one or more orders for the financial instrument (as identified in the order detail data) at predefined intervals or other times during a selected period, such as a trading day, and processes the order price and/or order size, the order eligibility rules, and BBO data. For example, the incentive eligibility module 308 retrieves order eligibility rules 132 and BBO data (e.g., a current BBO) and processes the order price and/or order size for one or more orders that correspond to each of the one or more market participants with the order eligibility rules and BBO data to identify one or more eligible orders based on the order price and/or order size at one second intervals during or throughout the trading day, such as during or throughout the entire trading day.

According to one aspect, the incentive eligibility module 308 assigns an eligible attribute value to an eligible order indicator associated with the order if the order price of the order is equal to the current BBO. The eligible attribute value is, for example, "Yes", "1", a flag, a symbol, or another value or indicator that indicates that the display price of the order is equal to the current BBO. The incentive eligibility module 308 optionally assigns an ineligible attribute value (No, Null, zero, etc.) to the eligible order indicator associated with the order if the order price is less aggressive than the current BBO. The incentive eligibility module 308 stores the assigned attribute value for the eligible order indicator with the corresponding order detail data stored in the data source 104 and/or memory and/or database. In one example, the order detail data is stored in an order record.

According to another aspect, the incentive eligibility module 308 assigns an eligible attribute value to the eligible order indicator associated with the order after the order executes and the order price for the order was equal to the current BBO in the market. In this example, the BBO or other BBO data was stored with the order detail data or as other data or in another location or memory, such as at the time the order was evaluated, displayed, or executed.

According to another aspect, the incentive eligibility module 308 retrieves order detail data from the data source 104 that corresponds to one or more market participants, based on a corresponding MPID or other participant identifier, at the end of a trading period or other selected period (e.g., hour, day, week, month, etc.). In one example, the incentive eligibility module 308 processes executed order detail data according to the participant eligibility rules 133 to identify market participants that are eligible for rewards or other incentives. In one other example, the participant eligibility rules 133 include a first set of one or more participant eligibility rules and a second set of one or more participant eligibility rules.

According to one aspect, the incentive eligibility module 308 processes the order detail data according to the first participant eligibility rules 133 to determine a number of eligible orders for each of the one or more market participants. In one example, for each MPID, the incentive eligibility module 308 retrieves and aggregates (e.g., sums) the total number of eligible orders at, or after the expiration of, the trading period or other selected period. The incentive eligibility module 308 stores the total number of eligible orders in the data source 104.

In one example, the incentive eligibility module 308 processes executed order detail data according to the second market participant eligibility rules 133 to calculate the total trade volume parameter based on order sizes of eligible orders associated with each of one or more market participants (e.g., using an MPID) submitted over a selected time period. The incentive eligibility module 308 then determines if the calculated total trade volume (TTV) parameter for that particular market participant is greater than one or more other calculated TTV parameters associated with one or more other market participants. In this example, the incentive eligibility module 308 determines that the particular market participant is eligible for a reward or other incentive when the TTV parameter for that particular market participant is greater than the other TTV parameters associated with other market participants.

According to one aspect, the incentive eligibility module 308 is configured to process order detail data according to the second market participant eligibility rules 133 to determine an aggregate order size from one or more orders for each market participant for a selected time and/or during a selected period. According to another aspect, the incentive eligibility module 308 is configured to process order detail data according to the second market participant eligibility rules 133 when two or more market participants have the same total number of eligible orders during the same trading period.

According to another aspect, the incentive eligibility module 308 assigns an eligible member attribute value to a CLP indicator associated with a particular market participant when that particular market participant is eligible for an incentive, such as a reward, for a selected time and/or period. The eligible member attribute value is, for example, "Yes", "1", a flag, a symbol, or another value or indicator that indicates that the particular market participant is eligible for an award or other incentive for a selected time and/or period. The incentive eligibility module 308 optionally assigns an ineligible member attribute value (No, Null, zero, etc.) to the CLP indicator associated with particular market participant when that particular market participant is not eligible for an award or other incentive for a selected time and/or period. The incentive eligibility module 308 stores the assigned member attribute value for the CLP indicator associated with each market participant in the data source 104 and/or memory and/or database.

According to one aspect, the execution of a first set and/or second set of participant eligibility rules 133 by the incentive eligibility module 308 is referred to as a size event test (SET). For example, the SET identifies a particular market participant as being eligible for a reward or other incentive based on the number of orders submitted by that particular market participant that include eligible order prices and/or the aggregate order size of one or more orders for that particular market participant at an eligible order price. Thus, to win a particular size event test for a selected time, a particular member must submit the most orders for one or more financial instruments that include an eligible order price for the selected time or, alternately, submit one or more orders for one or more financial instruments having the greatest aggregate size at an eligible order price. In one aspect, if there is a tie for the number of eligible orders submitted by two or more market participants, the particular member that has the greatest order volume as defined by the TTV parameter at the selected time has earned the incentive. In another aspect, if there is a tie for the greatest number of eligible orders submitted by two or more market participants, the two or more tying market participants have earned the incentive.

According to one aspect, the incentive eligibility module 308 executes a size event test at selected intervals (e.g., one second) throughout a first time period, such as a trading day, and processes the order detail data associated with each market participant to determine an amount, number, or percentage of SETs each market participants wins or earns during the first time period. According to one aspect, a market participant must have at least ten percent (10%) of the winning SETs during the trading day to be eligible to receive an award for that day.

The incentive eligibility module 308 determines the number of SETs each market participant earns during a selected period, such as a trading day. In one aspect, the incentive eligibility module 308 designates the market participant with the greatest number of earned SETs to have earned the incentive. In another aspect, the incentive eligibility module 308 assigns a value to a ranking attribute to each market participant corresponding to the number of SETs the market participant earned during the selected period. The incentive eligibility module 308 assigns the highest value to the ranking attribute for the market participant with the highest number of earned SETs, the next highest value to the market participant with the next highest number of earned SETs, etc. The incentive eligibility module 308 designates the market participant with the highest value of the ranking attribute to have earned the incentive.

In another aspect, the incentive eligibility module 308 assigns a ranking attribute to each market participant (or MPID) based on the number of SETs the corresponding market participant wins during a trading day. For example, a market participant that wins the highest number of sets during the trading day is assigned a ranking attribute value of 1 (e.g., first place) by the incentive eligibility module 308, and a market participant that wins the next highest number of SETs during the trading day is assigned a ranking attribute value of 2 (e.g., second place) by the incentive eligibility module.

The incentive eligibility module 308 stores the assigned ranking attribute value associated with each market participant in the data source 104 and/or memory and/or database. In one example, execution of the first set of participant eligibility rules 133 by the incentive eligibility module 308 only identifies market participants assigned the first and second place rankings as eligible for a reward.

The incentive eligibility module 308 processes order detail data collected during a second time period for each market participant according to the second set of participant eligibility rules 133 to identify market participants that remain eligible to receive incentives. For example, the second set of participant eligibility rules process the order detail data associated with each market participant to determine an amount, number, or percentage of SETs each market participant wins during a trading month. According to one aspect, a market participant must submit orders that are equal to the BBO at least ten percent (10%) of the time during the second time period in which the incentive eligibility module 308 executes one or more SETs.

The incentive eligibility module 308 optionally transmits one or more order detail data, such as the order price, the order side, the order quantity, the instrument ID, and/or other market data to one or more remote computing devices associated with other members of a local exchange. The incentive eligibility module 308 optionally may, alternately or in addition to the foregoing, transmit the order detail data to a routing service (e.g., the SIP system 110) that disseminates the order detail data to one or more other exchanges or other systems for display.

An execution module 310 executes a particular order when corresponding stored order detail data, such as an instrument ID and an order price, matches one or more available contra side orders. In other words, even if an order is more aggressive than the BBO, that order may not execute unless one or more matching contra side orders are available/executable. As an example, assume that the best sell price indicated by the BBO parameters of BBO data is $10.05. If the display price associated with a particular order corresponds to an offer to sell a particular financial instrument at $10.03, which is more aggressive than a sell price of $10.05, the execution module 310 only executes that particular order when a matching buy order is identified for that same particular financial instrument.

According to another aspect, the execution module 310 records an execution status for the order, such as in an execution status indicator. Recording an execution status includes, for example, storing a value or symbol indicating an order has executed (in volatile and/or non-volatile memory), changing the executed status value for a particular order record 130 in the data source 104 that has executed from a default value of "open" to "executed" (or from a 0 to a 1, etc.), or recording or changing an execution status for an execution status indicator to a positive indicator, e.g. from an empty, null, or zero value. According to another aspect, the execution module 310 stores an executed order record (not shown) in the local book table 128 that includes executed order detail data including the execution status. The executed order detail data is substantially the same as the order detail data.

An optional notification module 312 transmits an executed order notification to a participant, such as to a market participant's remote computing device and/or to another participant. The executed order notification includes executed order detail data. According to one aspect, the notification module 312 transmits the executed order notification to the remote computing device in the FIX message format. Another format may be used. In one example, the notification includes a number of fields that each corresponds to a tag value pairing that is separated from the next field by a delimiter. In addition to including tags that correspond to the instrument ID, the order side, the quantity, the price, and other executed order detail data. The notification optionally includes a tag or other data to indicate whether the order is at a BBO. For example, the notification may include a tag that includes a "Y", an "S", a 1, or another value for executed orders that are at a BBO.

An incentive value module 314 determines an award or other incentive value for a particular market participant eligible for a reward or other incentive according to one or more incentive value rules 134 retrieved from the data source 104. In one example, the incentive value module 314 retrieves the one or more incentive value rules 134 and processes the order detail data associated with one or more orders received from a particular market participant during a selected period according to the incentive value rules to determine a reward amount or other incentive value for the one or more orders and/or the market participant when the participant eligibility rules 132 identify that market participant is eligible for a reward or other incentive. In another example, the incentive value module 314 retrieves the one or more incentive value rules 134 and processes an event parameter, counter, ranking attribute, or trade volume parameter for a particular market participant for a selected period according to the incentive value rules to determine a reward amount or other incentive value for the one or more orders and/or for the market participant when the participant eligibility rules 132 identify that market participant is eligible for a reward or other incentive.

According to one aspect, the incentive value module 314 processes the order detail data associated with one or more orders from each market participant that are eligible for a reward or other incentive to identify an instrument ID and a class type associated with each instrument ID. The class type identifies, for example, a tier level of a financial instrument for more orders that are eligible for a reward or other incentive. The incentive value module 314 retrieves a reward amount or other incentive value from the data source 104 that corresponds to the identified tier level. For example, the data source 104 includes a reward amount table or other incentive value table that includes one or more reward amount records or other incentive value records. Each reward amount record or other incentive value record identifies a reward amount or other incentive value for a corresponding tier. As an example, a first reward amount record may identify a reward amount of $500 per day for a first tier level (e.g., Tier I) and second reward amount record may identify a reward amount of $100 per day for a second tier level (e.g., Tier II). Table 2 below depicts exemplary reward amount rules and associated data stored in a local data source 104.

TABLE 2

| Class of Security | Reward Amount in the Form of a Total Daily Rebate | Allocation of Daily Rebate |
| --- | --- | --- |
| Tier I Securities Listed on the Exchange for Six Months Commencing from the Date of Initial Listing on the Exchange | $500 per day | 80% ($400) to CLP with highest number of winning SETs; 20% ($100) to CLP with second highest number of winning SETs. |
| Tier I Securities Listed on the Exchange for Remaining Time Subject to CLP Program | $2500 per day | 80% ($200) to CLP with highest number of winning SETs; 20% ($50) to CLP with second highest number of winning SETs. |
| Tier II Securities Listed on the Exchange | $100 per day | 100% to CLP with highest number of winning SETs. |
| ETPs Listed on the Exchange | $250 per day | 80% ($200) to CLP with highest number of winning SETs; 20% ($50) to CLP with second highest number of winning SETs. |

As another example, each reward amount record identifies a reward amount for a corresponding tier level and/or a corresponding exchange rule. In this example, the first reward amount record may identify a reward amount of $500 per day for a first tier level (e.g., Tier I) and a first exchange rule, and the second reward amount record may identify a reward amount of $250 per day for the first tier level (e.g., Tier I) and a second exchange rule. As used herein, an exchange rule corresponds to governing rules (e.g., Security Exchange Commission) that specify, for example, a category and/or classification of financial instruments. For example, Tier I may refer to Rule 14.8, Tier II may refer to Rule 14.9, and ETPs may refer to Rule 14.11 in force at the time of this filing by the SEC, which are incorporated herein by reference.

According to another aspect, the incentive value module 314 retrieves the incentive value rules 134 to determine a number of participants that are eligible for a daily award amount and/or a percentage or an allocation of the daily award amount for each eligible market participant. The incentive value rules 134 may identify the market participants eligible to receive a percentage of a daily award amount based on a corresponding ranking attribute value retrieved from the data source for each market participant. As described above, the ranking attribute value is associated with each market participant eligible to receive a reward or other incentive and indicates the number of SETs each eligible market participant has won or earned during a selected period, such as a selected trading period. For example, if the daily reward amount associated with a particular class of security is $500, the reward amount rules may require that a market participant assigned a first place ranking receive a first percentage of the daily award (e.g., 80% or $400) and that another market participant assigned a second place ranking receive a second percentage of the daily award (e.g., 20% or $100). It is contemplated that the daily award may be allocated among one or more, including two or more, market participants.

Figure 4:
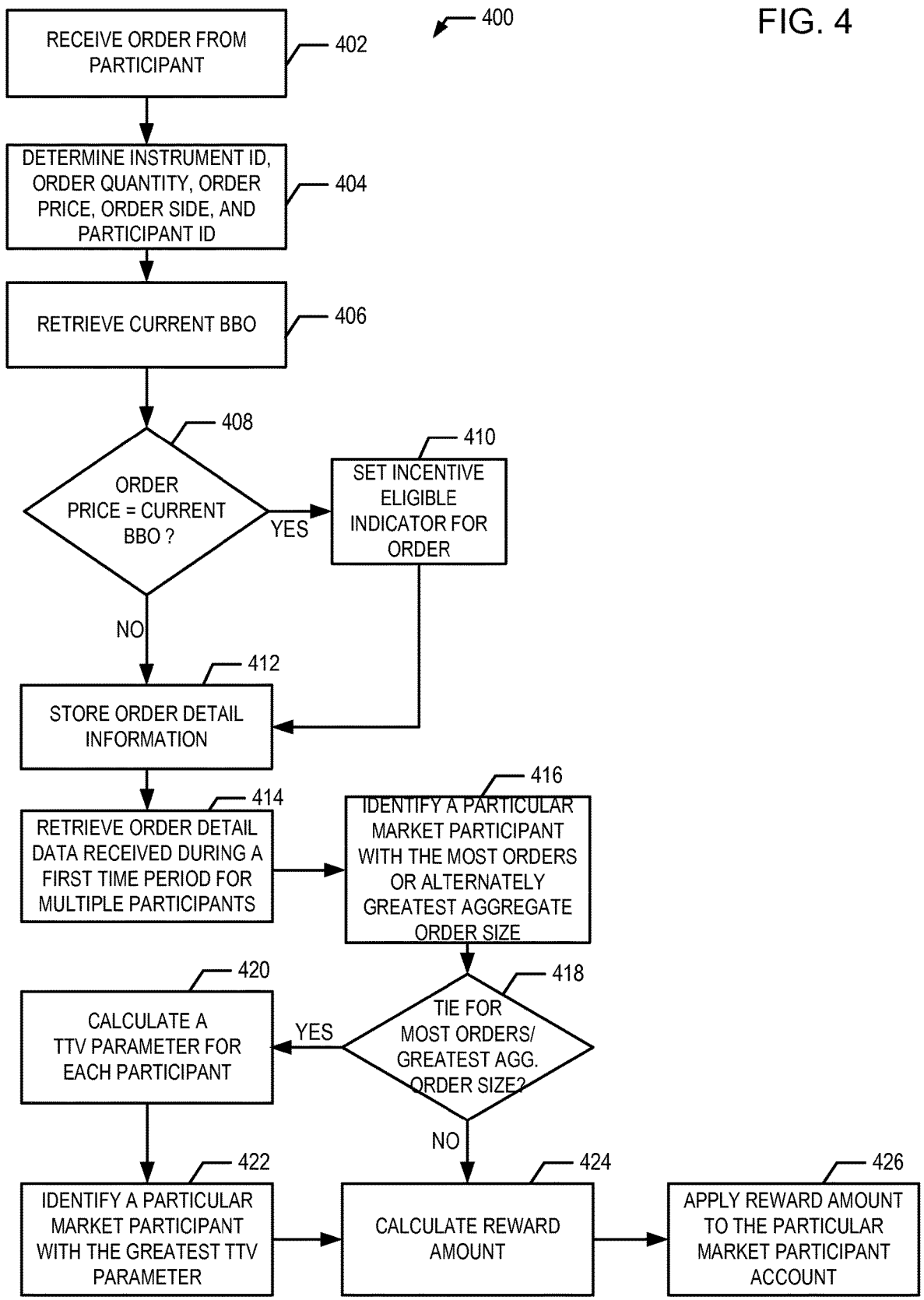
FIG. 4 is a process flow depicting a method for determining a reward amount for a market participant according to aspects of a market liquidity incentive system.

FIG. 4 depicts an exemplary embodiment of an incentive determination process 400 executed by at least one processor encoded with, or executing instructions of, an MLIA 103A. For example, the incentive determination process 400 is executed by the local server 102A or computing device 300A, such as at or of an electronic financial exchange. At 402, the MLIA 103A receives an order, such as from a remote device (e.g., remote device 106) associated with a market participant. At 404, the MLIA 103A processes the order to determine order detail data (e.g. order information), such as one or more of a financial instrument ID, an order type (or security type or other financial instrument type), an order quantity (e.g. size), an order price, an order side (i.e., buy order side or sell order side), and a participant ID (such as an MPID) or other participant, member, or order identifier. For example, the MLIA 103 may determine a symbol or instrument ID for a security, option, or other financial instrument. At 406, the MLIA 103A retrieves or receives BBO data, such as the current BBO, for the financial instrument corresponding to the financial instrument identified in the order (e.g. corresponding to a financial instrument ID).

At 408, the MLIA 103A determines if the order price for the order is equal to the BBO. If the order price for the order is less aggressive than the BBO at 408, the MLIAA 103 stores the order detail data for the order (e.g. order information) in a memory and/or other data source and/or other database at 412. Optionally, the order price, order size, and/or BBO may be stored with the order detail data (e.g. as order information).

If the order price for the order is determined to equal the BBO at 408, the MLIA 103A assigns an incentive eligible attribute to an incentive eligible indicator for the order at 410 to indicate that the order price is an incentive eligible order price and stores the order detail data in a memory and/or other data source and/or database at 412. In one example, the incentive eligible indicator is a reward eligible indicator, and the incentive eligible attribute is a reward eligible attribute. Optionally, the order price and/or incentive eligible attribute and/or BBO may be stored with the order detail data (e.g. as order information). The incentive eligible indicator may be, for example, a flag, a database column or entry, a record, or another indicator to indicate the order price of the order is a reward or other incentive eligible order price (e.g. the order price was equal to the BBO). The incentive eligible attribute may be, for example, a flag entry, a 1 (to indicate the order price is an incentive eligible order price) or 0 (to indicate the order price is not an incentive eligible order price), a first symbol or first database entry or first record (to indicate the order price is an incentive eligible order price), or a second symbol or second database entry or second record (to indicate the order price is an incentive eligible order price).

Optionally, if the order price for the order is less aggressive than the current BBO at 408, the MLIA 103A resets (e.g. sets to zero or null) an incentive eligible indicator or otherwise indicates that a reward or other incentive indicator for the order indicates the order price for the order is less aggressive than the current BBO at 410.

The MLIA 103A retrieves order detail data for each of one or more orders received during a first time period at 414. For example, the first time period may correspond to a trading day. At 416, the MLIA 103A identifies a particular market participant that submits the most number of orders, or alternately the greatest aggregate order size, that are eligible for an incentive during the first time period. For example, the MLIA 103A identifies a particular market participant that submits the most number of orders, or alternately the greatest aggregate order size, assigned an incentive eligible attribute.

At 418, the MLIA 103A determines if there is tie between two or more participants that have submitted the most number of orders, or alternately the greatest aggregate order size, eligible for an incentive. If there is a tie at 418, the MLIA 103A calculates a TTV parameter for each of the two or more participants that have submitted the most number of orders eligible for a reward at 420. At 422, the MLIA 103A compares the TTV calculated for each of the two or more participants to identify a particular market participant associated with the greatest TTV parameter. The MLIA 103A calculates a reward amount or other incentive value for the particular market participant identified as submitting the most number of orders, or alternately the greatest aggregate order size, at 424.

If there is not a tie at 418, the MLIA 103A calculates a reward amount or other incentive value for the particular market participant identified as submitting the most number of orders, or alternately the greatest aggregate order size, at 424. At 426, the MLIA 103A applies a reward or other incentive to the market participant's account that corresponds to that MPID. In one example, the MLIA 103A issues a credit or directs another process of the exchange to issue a credit to the account for the participant ID.

Figure 5A:
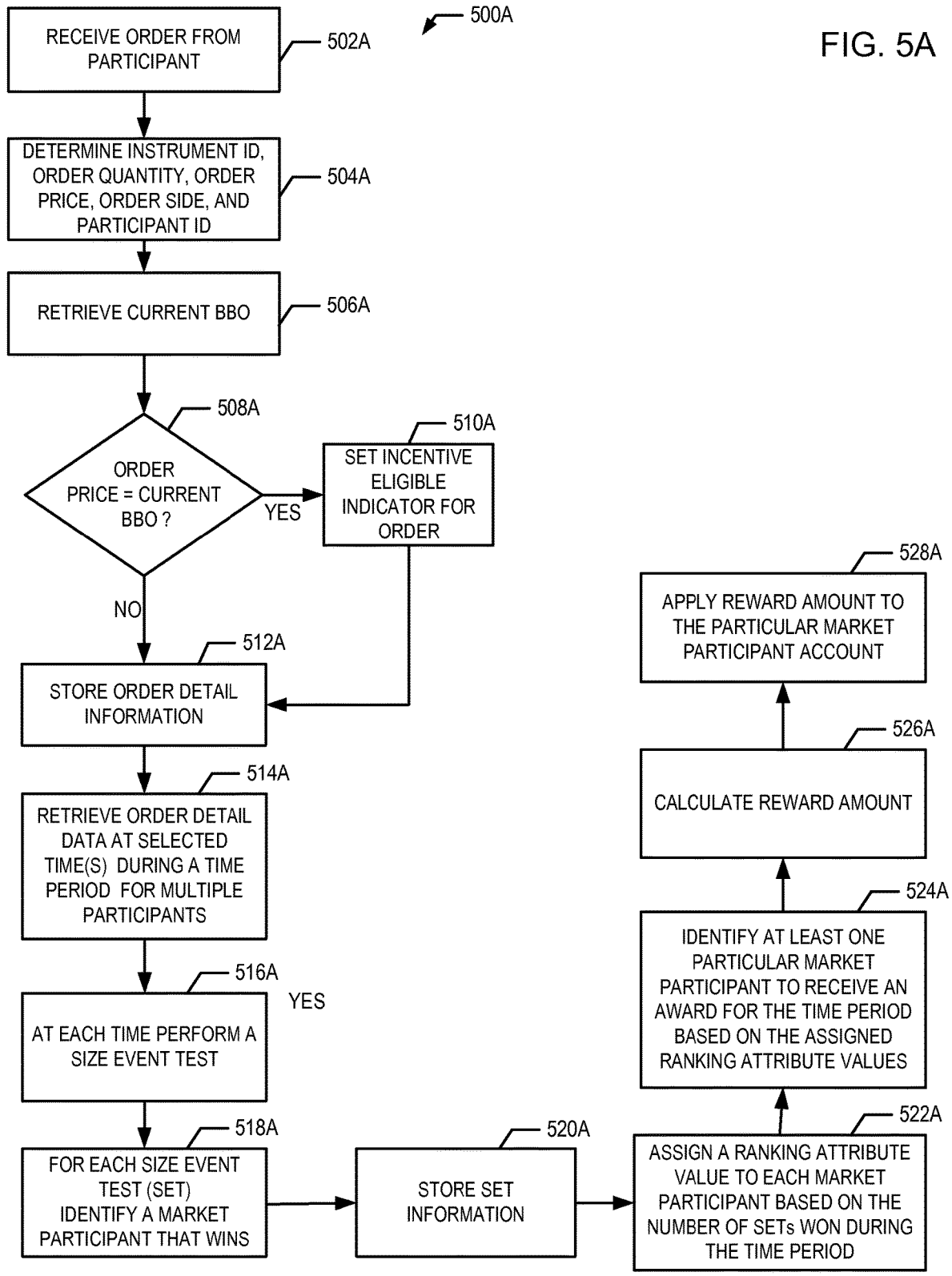

FIG. 5A depicts an exemplary embodiment of an incentive determination process 500A executed by at least one processor encoded with, or executing instructions of, an MLIA 103B. For example, the incentive determination process 500A is executed by the local server 102 or computing device, such as at or of an electronic financial exchange. At 502A, the MLIA 103B receives an order, such as from a remote device (e.g., remote device 106) associated with a market participant. At 504A, the MLIA 103B processes the order to determine order detail data (e.g. order information), such as a security type (e.g., option or other financial instrument type), a financial instrument ID, an order quantity (size), an order price, an order side (i.e., buy order side or sell order side), and a participant ID (such as an MPID) or other participant, member, or order identifier. For example, the MLIA 103B may determine a symbol or instrument ID for a security, option, or other financial instrument. At 506A, the MLIA 103B retrieves or receives market data, such as the current BBO, for the financial instrument corresponding to the financial instrument identified in the order (e.g. corresponding to a financial instrument ID).

At 508A, the MLIA 103B determines if the order price for the order is equal to the BBO. If the order price for the order is less aggressive than the BBO at 508A, the MLIA 103B stores the order detail data for the order (e.g. order information) in a memory and/or other data source and/or database at 512A. Optionally, the order price and/or BBO may be stored with the order detail data (e.g. as order information).

If the order price for the order is determined to be equal to the BBO at 508A, the MLIA 103B assigns an incentive eligible attribute to an incentive eligible indicator for the order at 510A to indicate that the order price is a reward or other incentive eligible order price and stores the order detail data in a memory and/or other data source and/or database at 512A. In one example, the incentive eligible indicator is a reward eligible indicator, and the incentive eligible attribute is a reward eligible attribute. Optionally, the order price and/or reward or other incentive eligible attribute and/or BBO may be stored with the order detail data (e.g. as order information). The reward or other incentive eligible indicator may be, for example, a flag, a database column or entry, a record, or another indicator to indicate the order price of the order is a reward or other incentive eligible order price (e.g. the order price was more aggressive than the BBO). The reward or other incentive eligible attribute may be, for example, a flag entry, a 1 (to indicate the order price is an eligible order price) or 0 (to indicate the order price is not an eligible order price), a first symbol or first database entry or first record (to indicate the order price is an eligible order price), or a second symbol or second database entry or second record (to indicate the order price is an eligible order price).

Optionally, if the order price for the order is less aggressive than the current BBO at 508A, the MLIA 103B resets (e.g. sets to zero or null) an incentive eligible indicator or otherwise indicates that a reward or other incentive indicator for the order indicates the order price for the order is less aggressive than the current BBO at 510A.

The MLIA 103B retrieves order detail data at selected times, such as intervals, for each of one or more orders received from multiple market participants during a first time period at 514A. For example, the first time period may correspond to a trading day and the selected intervals may correspond to one (1) second time intervals. Thus, in this example, order detail data is retrieved at one second intervals throughout through the trading day. At 516A, the MLIA 103B performs a size event test (SET), as described herein, at each interval. At 518A, for each SET, the MLIA 103B indentifies a particular market participant that wins the SET and stores the set information in a memory and/or other data source and/or database at 520A. The set information may be a SET indicator that is, for example, a flag, or another indicator that indicates whether or not a particular market participant (i.e., MPID) won a SET at a particular interval. The SET indicator may be, for example, a flag entry, a 1 (to indicate particular market participant won a SET) or 0 (to indicate the particular market participant did not win a SET).

The MLIA 103B assigns a ranking attribute value to each market participant based on a number of SETs won by each market participant during the first time period at 522A. For example, as explained above, the market participant that wins the greatest number of SETs during the first time period is a assigned a ranking of $1^{st}$ place and the market participant that wins the next greatest number of SETs during the first time period is assigned a ranking of $2^{nd}$ place, etc. At 524A, the MLIA 103B indentifies at least one particular market participant (MPID) to receive a reward or other incentive based on the assigned ranking attribute values. For example, the MLIA 103B indentifies a particular market participant that has been assigned the highest ranking attribute value (e.g., $1^{st}$ place) to receive a reward or other incentive. Optionally, the MLIA 103B indentifies the two particular market participants that have been assigned the highest two ranking attribute values (e.g., first place and second place.)

At 526A, the MLIA 103B calculates a reward amount or other incentive value for the at least one particular market participant identified at 524A. The reward amount or other incentive value is calculated based on to the reward amount rules and/or the reward amount table described above or other incentive value rules and/or incentive value table. At 528, the MLIA 103B applies the reward amount or other incentive value to the market participant's account that corresponds to that MPID. In one example, the MLIA 103B issues a credit or directs another process of the exchange to issue a credit to the account for the market participant ID.

FIG. 5B depicts an exemplary embodiment of an incentive determination process 500B executed by at least one processor encoded with an MLIA 103C. The process steps 502B-524B of the incentive determination process 500B are substantially the same as the process steps 502A-524A described above in reference to FIG. 5A. However, after the at least one particular market participant identified at 524B, the incentive determination process 500B further includes the MLIA 103C retrieving SET data for orders submitted by the at least one particular market participant during a second time period at 526B.

At 528B, the MLIA calculates the number of SETs won by the at least one particular market participant during a second time period. The MLIA 103C compares the number of SETs won by the at least one particular market participant during the second time period to a threshold parameter value (TPV) to determine if the at least one particular market participant is eligible for a reward or other incentive at 530B. As an example, the threshold value may be 0.1% of the total SETs performed during the second time period.

When the number of SETs won by the at least one particular market participant during the second time period is greater than (or alternately is greater than or equal to) the threshold parameter value at 530B, the MLIA 103C calculates a reward amount or other incentive value for the at least one particular market participant identified at 532B. At 534B, the MLIA 103C applies the reward amount or other incentive value to the market participant's account that corresponds to that MPID. The reward amount or other incentive value is calculated based on to the reward amount rules and/or the reward amount table or other incentive value rules and/or incentive value table described above. In one example, the MLIA 103C issues a credit or directs another process of the exchange to issue a credit to the account for the participant ID.

When the number of SETs won by the at least one particular market participant during the second time period is less than the threshold parameter value at 530B, the MLIA 103 designates the at least one particular market participant as ineligible for a reward or other incentive.

Figure 6:
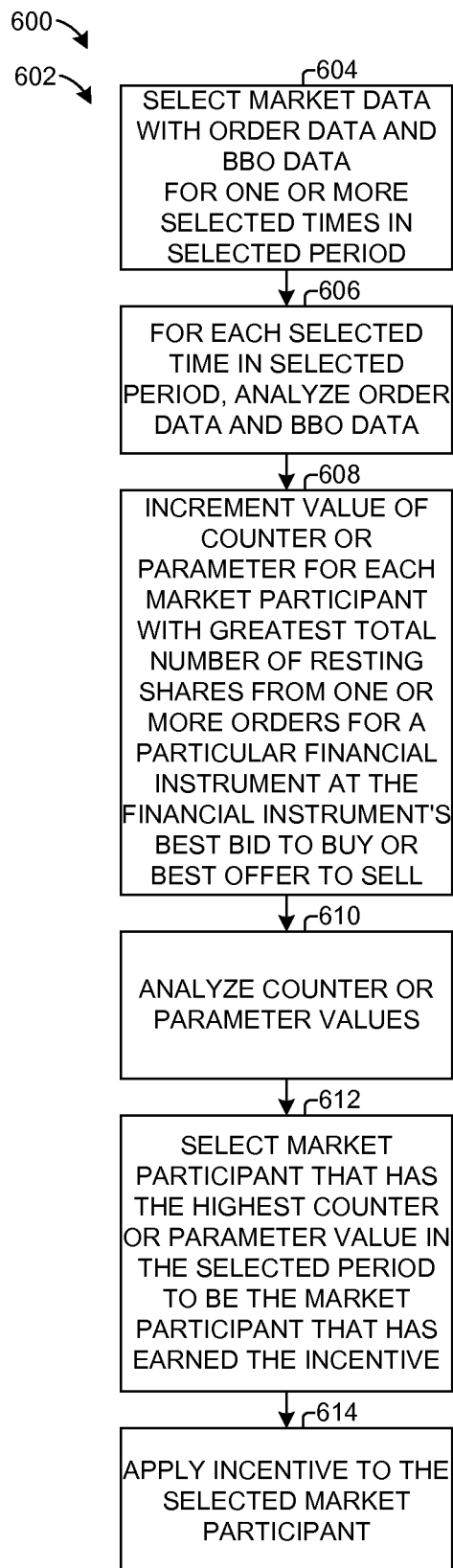

FIG. 6 depicts an exemplary embodiment of an incentive determination process 600 of a market liquidity incentive application 602 having one or more modules executed by at least one processor encoded with, or executing instructions of, the MLIA. For example, the incentive determination process 600 is executed by the local server 102A or computing device 300A, such as at or of an electronic financial exchange.

At 604, the MLIA 602 selects market data for shares on the financial exchange's book (e.g. resting shares), such as market data at or for one or more selected times for or during a selected period. The selected times may be time points, such as time increments or intervals, and the selected period may be a trading day, trading week, hour, day, week, month, or other period. The market data includes order data for resting shares, including the total number of resting shares from one or more orders of one or more financial instruments from each of one or more participants and the corresponding prices for the resting shares, and the best bids to buy and/or best offers to sell for the financial instruments.

The MLIA has a counter, parameter, or attribute for each market participant. The initial count or value for the counter, parameter, or attribute may, for example, start at or be set at zero or another value.

At 606, for each selected time, the MLIA analyzes the order data and the best bids to buy and best offers to sell (such as by comparing the order data for each market participant for the selected time). At 608, the MLIA increments a counter value of a participant's counter, parameter, or attribute by a selected value for each market participant that has the greatest total number of resting shares from one or more orders for a particular financial instrument at the financial instrument's best bid to buy or best offer to sell.

In one example, the counter value is incremented by the total number of resting shares from the one or more orders for the particular financial instrument that were at the financial instrument's best bid to buy or best offer to sell at that compared time increment. In another example, the counter value is incremented by a unit, such as by 1 (e.g. from 0 to 1, from 1 to 2, etc) or another unit or value.

In another example, the counter is incremented by the total number of resting shares from the one or more orders for the particular financial instrument that were at the financial instrument's best bid to buy and best offer to sell at that compared time increment. In this example, the buy side and sell side orders are aggregated.

In another example, the counter is incremented by the total number of resting shares from the one or more orders for the particular financial instrument that were at the financial instrument's best bid to buy and best offer to sell at that compared time increment. In this example, the buy side orders at the best bid to buy and the sell side orders at the best offer to sell are aggregated.

In another example, the counter is incremented by the total number of resting shares from the one or more orders for the particular financial instrument that were at the financial instrument's best bid to buy or best offer to sell at that compared time increment. In this example, the buy side orders at the best bid to buy or the sell side orders at the best offer to sell are aggregated.

In another example, the counter is incremented by the total number of resting shares from the one or more orders for the particular financial instrument that were at the financial instrument's best bid to buy for analysis of the buy side only and a determination of a reward or other incentive for only the buy side. In this example, only the buy side orders are aggregated and analyzed.

In another example, the counter is incremented by the total number of resting shares from the one or more orders for the particular financial instrument that were at the financial instrument's best offer to sell for analysis of the sell side and determination of a reward or other incentive for only the sell side. In this example, only the sell side orders are aggregated and analyzed.

At 610, the MLIA analyzes the counter values assigned to each market participant for a selected period, such as a trading day or other period, to determine the market participant that has the highest counter value in the selected period (such as by comparing the values of each market participant's counter).

At 612, the MLIA selects the market participant that has the highest counter value in the selected period to be the market participant that has earned the incentive.

In one aspect, if there is a tie between two or more market participants having the same highest counter value, the particular member that has the greatest order volume is selected to have earned the incentive. In another aspect, if there is a tie between two or more market participants having the same highest counter value, the market participants with the same highest counter value are selected to have earned the incentive. At 614, the MLIA applies the incentive to the selected market participant(s) that earned the incentive, such as to the market participant's account. In one example, the incentive is a reward.

Figure 7:
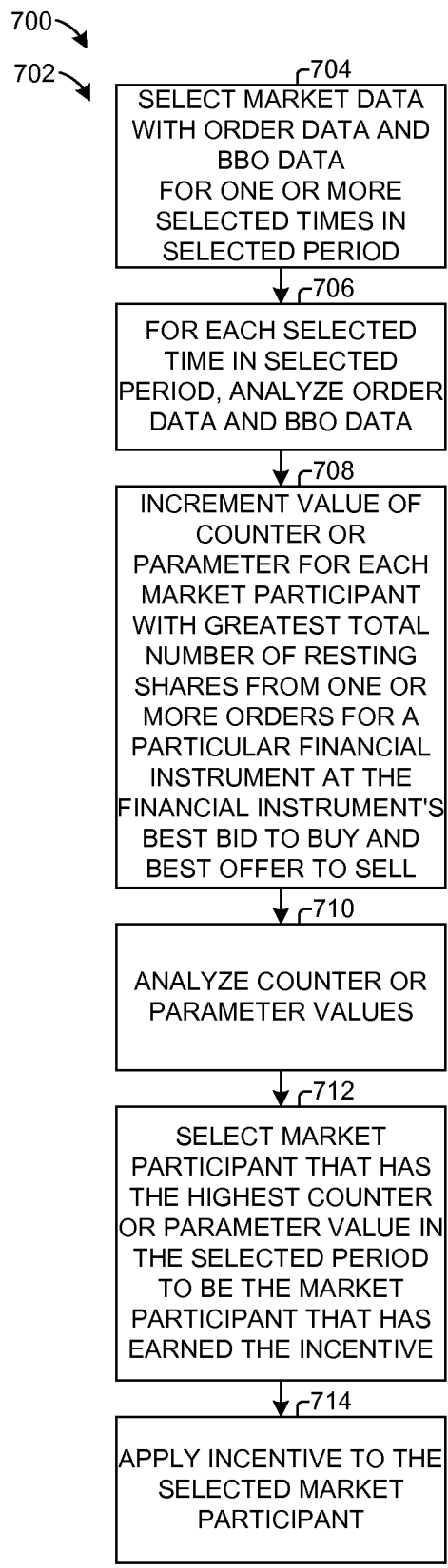

FIG. 7 depicts an exemplary embodiment of an incentive determination process 700 of a market liquidity incentive application 702 having one or more modules executed by at least one processor encoded with, or executing instructions of, the MLIA. For example, the incentive determination process 700 is executed by the local server 102A or computing device 300A, such as at or of an electronic financial exchange.

The MLIA measures the total liquidity across a selected period, such as across all measured times during the trading day, for an aggregate best bid to buy and best offer to sell, instead of for a best bid to buy or best offer to sell. The aggregate best bid to buy and best offer to sell shares is the total number of shares at the best bid to buy plus the total number of shares at the best offer to sell.

At 704, the MLIA selects market data for shares on the financial exchange's book (e.g. resting shares), such as market data at or for one or more selected times for or during a selected period. The selected times may be time points, such as time increments or intervals, and the selected period may be a trading day, trading week, hour, day, week, month, or other period. The market data includes order data for resting shares, including the total number of resting shares from one or more orders of one or more financial instruments from each of one or more participants and the corresponding prices for the resting shares, and the best bids to buy and/or best offers to sell for the financial instruments.

The MLIA has a counter, parameter, or attribute for each market participant. The initial count or value for the counter, parameter, or attribute may, for example, start at or be set at zero or another value.

At 706, for each selected time, the MLIA analyzes the order data and the best bids to buy and best offers to sell (such as by comparing the order data for each market participant for the selected time). At 708, the MLIA increments a counter value of a participant's counter, parameter, or attribute for each market participant that has the greatest total number of resting shares from one or more orders for a particular financial instrument at the financial instrument's best bid to buy and best offer to sell (i.e. the total combined resting shares). The total number of shares from one or more orders from a market participant for a particular financial instrument is referred to herein as the total combined shares. The total combined shares may be combined in one example at the financial instrument's best bid to buy and best offer to sell. The total combined shares may be combined in another example at the financial instrument's best bid to buy for analysis of the buy side and determination of a reward or other incentive for the buy side. The total combined shares may be combined in another example at the financial instrument's best offer to sell for analysis of the sell side and determination of a reward or other incentive for the sell side. The total number of resting shares from one or more orders for a particular financial instrument is referred to herein as the total combined resting shares. In one example, the counter value is incremented by the total number of resting shares from the one or more orders for the particular financial instrument that were at the financial instrument's best bid to buy and best offer to sell for the selected time. In another example, the counter value is incremented by a unit, such as by 1 (e.g. from 0 to 1, from 1 to 2, etc) or another unit.

At 710, the MLIA analyzes the counter values assigned to each market participant for a selected period to determine the market participant that has the highest counter value in the selected period (such as by comparing the values of each market participant's counter), such as a trading day. At 712, the MLIA selects the market participant that has the highest counter value in the selected period to be the market participant that has earned the incentive. In one aspect, if there is a tie between two or more market participants having the same counter value, the particular member that has the greatest order volume is selected to have earned the incentive. In another aspect, if there is a tie between two or more market participants having the same counter value, the market participants with the same highest counter value are selected to have earned the incentive. At 714, the MLIA applies the incentive to the selected market participant(s) that earned the incentive, such as to the market participant's account. In one example, the incentive is a reward.

Figure 8:
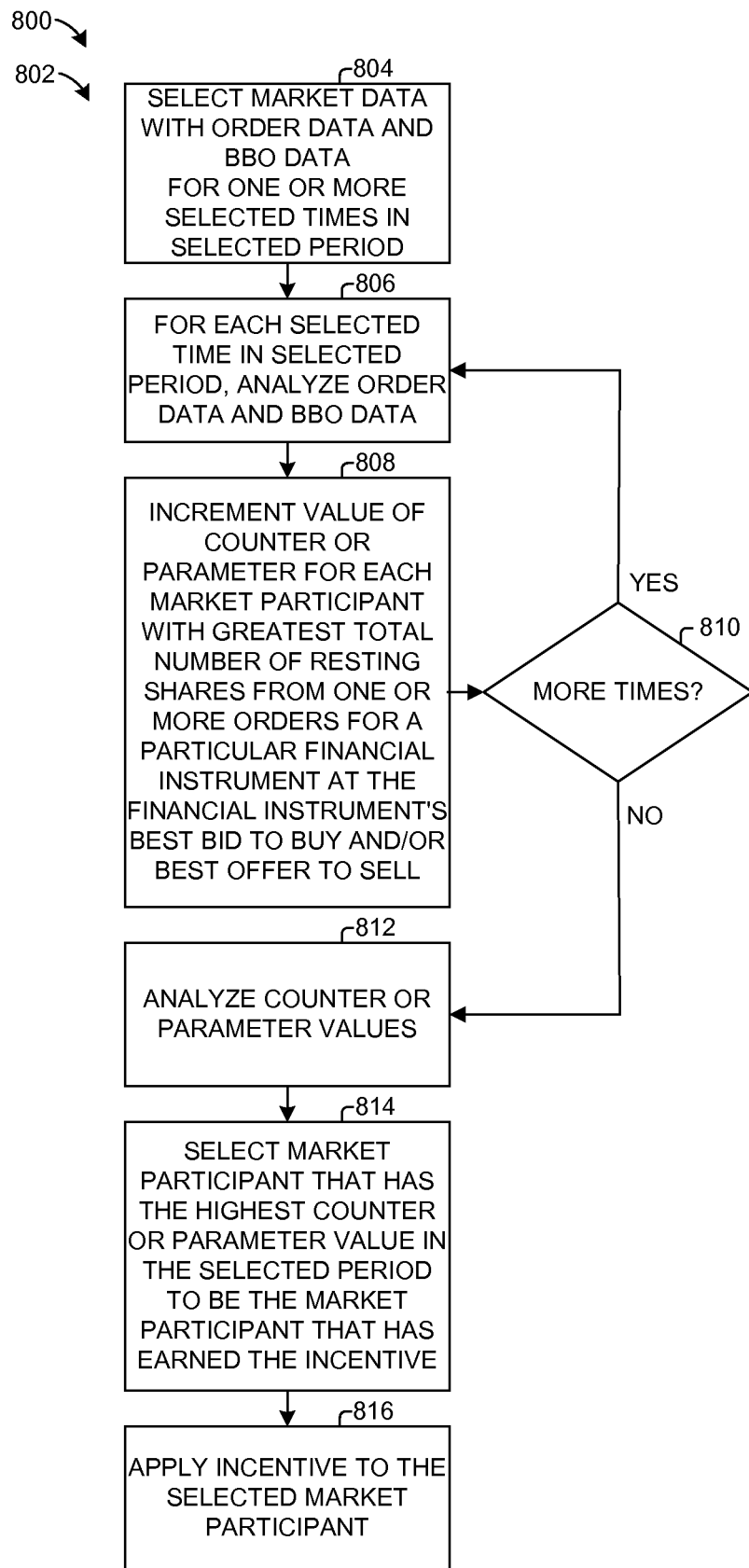

FIG. 8 depicts an exemplary embodiment of an incentive determination process 800 of a market liquidity incentive application 802 having one or more modules executed by at least one processor encoded with, or executing instructions of, the MLIA. For example, the incentive determination process 800 is executed by the local server 102A or computing device 300A, such as at or of an electronic financial exchange. The MLIA measures the total liquidity across a selected period, such as across all measured times during the trading day.

At 804, the MLIA 802 selects market data for shares on the financial exchange's book (e.g. resting shares), such as market data at or for one or more selected times for or during a selected period. The selected times may be time points, such as time increments or intervals, and the selected period may be a trading day, trading week, hour, day, week, month, or other period. The market data includes order data for resting shares, including the total number of resting shares from one or more orders of one or more financial instruments from each of one or more participants and the corresponding prices for the resting shares, and the best bids to buy and/or best offers to sell for the financial instruments.

The MLIA has a counter, parameter, or attribute for each market participant. The initial count or value for the counter, parameter, or attribute may, for example, start at or be set at zero or another value.

At 806, for each selected time, the MLIA analyzes the order data and the best bids to buy and best offers to sell (such as by comparing the order data for each market participant for the selected time). At 808, the MLIA increments a counter value of a participant's counter, parameter, or attribute by a selected value for each market participant that has the greatest total number of resting shares from one or more orders for a particular financial instrument at the financial instrument's best bid to buy and/or best offer to sell. In one example, the counter value is incremented by the total number of resting shares from the one or more orders for the particular financial instrument that were at the financial instrument's best bid to buy or best offer to sell at that compared time increment. In another example, the counter value is incremented by a unit, such as by 1 (e.g. from 0 to 1, from 1 to 2, etc) or another unit.

At 810, the MLIA determines if there are more times. At 810, if there are more times, the MLIA returns to 806. If there are no more times at 810, the MLIA the MLIA analyzes the counter values assigned to each market participant, such as for a selected period, at 812 to determine the market participant that has the highest counter value in the selected period (such as by comparing the values of each market participant's counter), such as a trading day. At 814, the MLIA selects the market participant that has the highest counter value in the selected period to be the market participant that has earned the incentive. In one aspect, if there is a tie between two or more market participants having the same counter value, the particular member that has the greatest order volume is selected to have earned the incentive. In another aspect, if there is a tie between two or more market participants having the same counter value, the market participants with the same highest counter value are selected to have earned the incentive. At 816, the MLIA applies the incentive to the selected market participant that earned the incentive, such as to the market participant's account. In one example, the incentive is a reward.

In aspects herein, a selected time may be a time, for example, a time point, a time increment, or another selected time. In one example, one or more selected times are time increments. In another example, the one or more selected times are one-second time increments. In another example, one or more selected times are one or more times during a trading day. One or more selected times alternately may be one or more randomized times or one or more non-randomized times. A combination of one or more of the foregoing may be used.

The selected period may be, for example, a trading day (including regular hours only, extended trading hours, auction hours, or a combination of one or more of the foregoing), a week with one or more trading days, a month with one or more trading days, an hour, multiple hours, another period of time, a period with respect to trades, or another period.

In aspects of the MLIAs of FIGS. 6-8 and otherwise herein, the MLIA limits the analysis to order data for one or more selected financial instruments and BBO data (best bid to buy data and/or best offer to sell data) for the selected financial instruments.

In one example of the MLIAs of FIGS. 6-8 and otherwise herein, the MLIA selects and analyzes the market data at the one or more selected times during the selected period.

In another example, the MLIA selects and analyzes the market data for the one or more selected times, not necessarily at the one or more selected times and not necessarily during the selected period. In another example, the MLIA analyzes the counter values for each market participant for the selected period, not necessarily at or during the selected period.

In still another example of the MLIAs of FIGS. 6-8 and otherwise herein, the MLIA analyzes order data and BBO data for only best bids to buy. In still another example, the MLIS analyzes order data and BBO data for only best offers to sell.

In still another aspect of the MLIAs of FIGS. 6-8 and otherwise herein, the MLIA analyzes only order data from orders displayed (or, alternately, displayable) at the exchange for the MLIS for the incentive determination. A displayable order is an order or a portion of another order that will be visible as a trading interest, such as on the exchange or other financial market based on a current BBO. A non-displayable order is an order or a portion of another order that is not or will not be visible as a trading interest, such as on the exchange or other financial market.

Figure 9:
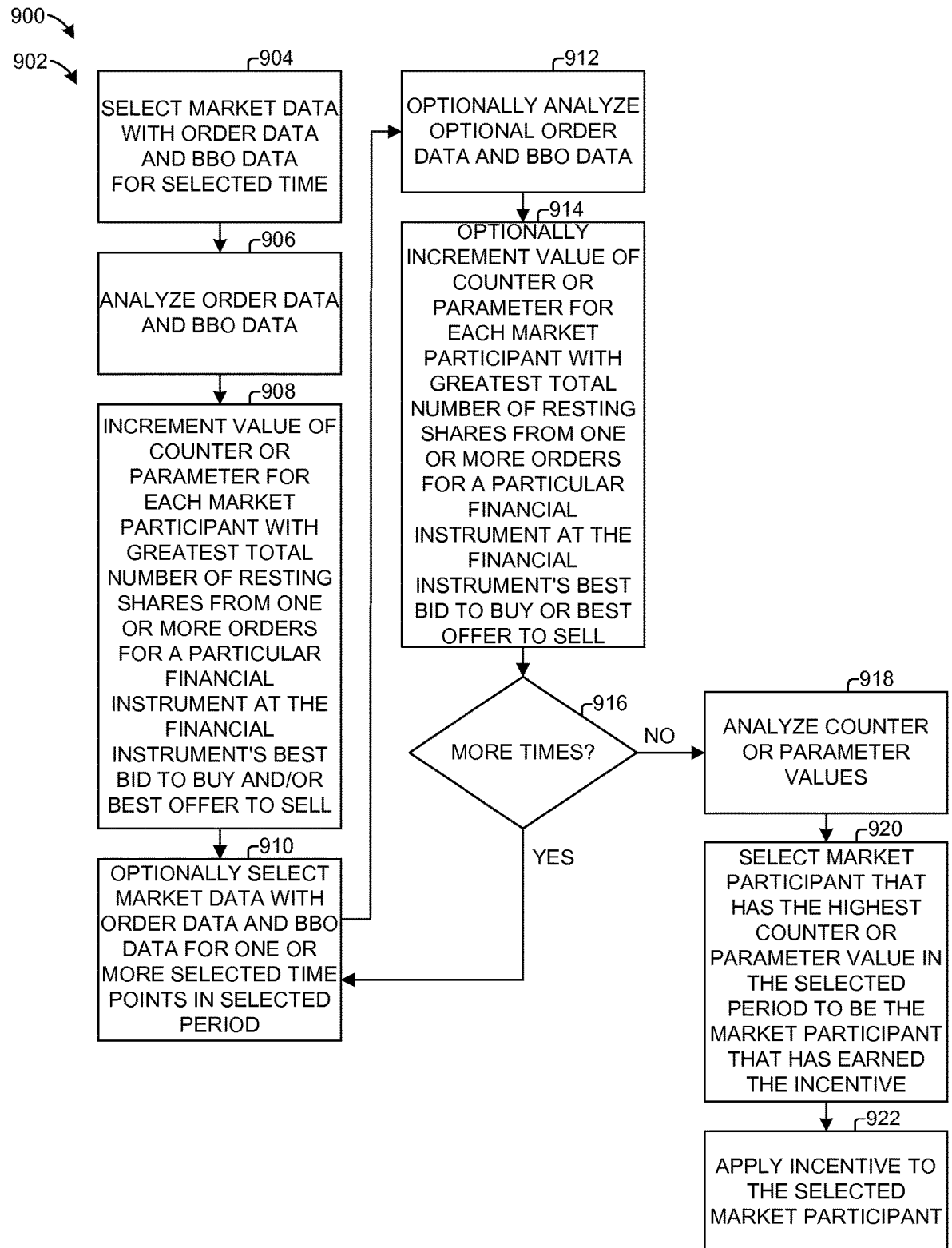

FIG. 9 depicts an exemplary embodiment of an incentive determination process 900 of a market liquidity incentive application 902 having one or more modules executed by at least one processor encoded with, or executing instructions of, the MLIA. For example, the incentive determination process 900 is executed by the local server 102A or computing device 300A, such as at or of an electronic financial exchange.

At 904, the MLIA 902 selects market data for shares on the financial exchange's book (e.g. resting shares), such as market data at or for a selected time point. The market data includes order data for resting shares, including the number of resting shares from one or more orders of one or more financial instruments from each of one or more participants and the corresponding prices for the resting shares, and financial instruments BBO data. Financial instrument BBO data includes data identifying the best bid to buy for a financial instrument and/or the best offer to sell for the financial instrument or such data for multiple financial instruments.

The MLIA has a counter, parameter, or attribute for each market participant. The initial count or value for the counter, parameter, or attribute may, for example, start at or be set at zero or another value.

At 906, the MLIA analyzes the order data and the best bids to buy and best offers to sell (such as by comparing the order data for each participant). At 908, the MLIA increments a counter value of the counter, parameter, or attribute for each market participant that has the greatest total number of resting shares from one or more orders for a particular financial instrument at the financial instrument's best bid and/or best offer for that selected point in time.

The MLIA optionally selects market data for the financial exchange for one or more additional points in time during a trading day or other selected period at 910, analyzes the order data and the BBO data for each additional point in time (such as by comparing the order data for each participant) at 912, and increments a counter value of the counter, parameter, or attribute for each market participant that has the greatest total number of resting shares from one or more orders for a financial instrument at the best bid or best offer at 914.

At 916, the MLIA determines if there are more times. At 916, if there are more times for the selected period, the MLIA returns to 910. If there are no more times for the selected period at 916, the MLIA analyzes the values of the counter assigned to each market participant to each other for a selected period (such as by comparing the values of each market participant's counter) (such as by comparing the values of each market participant's counter), such as a trading day or other period, at 918. At 920, the MLIA selects the market participant that has the highest counter value in the selected period to be the market participant that has earned the incentive. In one aspect, if there is a tie between two or more market participants having the same highest counter value, the particular member that has the greatest order volume is selected to have earned the incentive. In another aspect, if there is a tie between two or more market participants having the same highest counter value, the market participants with the same highest counter value are selected to have earned the incentive. At 922, the MLIA applies the incentive to the selected market participant that earned the incentive, such as to the market participant's account. In one example, the incentive is a reward.

A parameter, such as an event parameter, may be used in place of a counter in one or more aspects of FIGS. 6-9 and otherwise herein. A parameter is a variable or storage that has or holds a value. Thus, the MLIA may increment an event parameter by a value or assign or otherwise store a value to the event parameter for a market participant instead of incrementing a counter value for the market participant. The value for the parameter may, for example, start at zero or another value.

FIG. 10 depicts an exemplary embodiment of an incentive determination process 1000 of a market liquidity incentive application 1002 having one or more modules executed by at least one processor encoded with, or executing instructions of, the MLIA. For example, the incentive determination process 1000 is executed by the local server 102A or computing device 300A, such as at or of an electronic financial exchange.

The MLIA has an event parameter for each market participant. The initial count or value for the event parameter may, for example, be set at zero or another value.

At 1004, the MLIA 1002 selects market data for shares on the financial exchange's book (e.g. resting shares), such as market data for one or more selected times in a selected period. The market data includes order data for resting shares, including the number of resting shares from one or more orders of one or more financial instruments from each of one or more participants and the corresponding prices for the resting shares, and financial instruments BBO data. Financial instrument BBO data includes data identifying the best bid to buy for a financial instrument and/or the best offer to sell for the financial instrument or such data for multiple financial instruments.

At 1006, the MLIA analyzes the order data and the best bids to buy and best offers to sell. At 1008, the MLIA increments an event parameter value of a market participant's event parameter for each market participant that has the greatest total number of resting shares from one or more orders for a particular financial instrument at the financial instrument's best bid to buy and/or best offer to sell. In one example, the event parameter value is incremented by the total number of resting shares from the one or more orders for the particular financial instrument that were at the financial instrument's best bid to buy and/or best offer to sell for the selected time. In another example, the event parameter value is incremented by a unit, such as by 1 (e.g. from 0 to 1, from 1 to 2, etc) or another unit.

At 1010, the MLIA determines if there are more times. At 1010, if there are more times for the selected period, the MLIA returns to 1006. If there are no more times for the selected period at 1010, the MLIA analyzes the event parameter values assigned to each market participant for a selected period at 1012 to determine the market participant that has the highest event parameter value in the selected period (such as by comparing the values of each market participant's event parameter), such as a trading day. At 1014, the MLIA selects the market participant that has the highest event parameter value in the selected period to be the market participant that has earned the incentive. In one aspect, if there is a tie between two or more market participants having the same highest event parameter, the particular member that has the greatest order volume is selected to have earned the incentive. In another aspect, if there is a tie between two or more market participants having the same highest event parameter, the market participants with the same highest event parameter are selected to have earned the incentive. At 1016, the MLIA applies the incentive to the selected market participant that earned the incentive, such as to the market participant's account. In one example, the incentive is a reward.

FIG. 11 depicts an exemplary embodiment of an incentive determination process 1100 of a market liquidity incentive application 1102 having one or more modules executed by at least one processor encoded with, or executing instructions of, the MLIA. For example, the incentive determination process 1100 is executed by the local server 102A or computing device 300A, such as at or of an electronic financial exchange.

At 1104, the MLIA 1102 selects market data for shares on the financial exchange's book (e.g. resting shares), such as market data for one or more selected times in a selected period. The market data includes order data for resting shares, including the number of resting shares from one or more orders of one or more financial instruments from each of one or more participants and the corresponding prices for the resting shares, and financial instruments BBO data. Financial instrument BBO data includes data identifying the best bid to buy for a financial instrument and/or the best offer to sell for the financial instrument or such data for multiple financial instruments.

At 1106, the MLIA compares an aggregate number of shares of a financial instrument resting on the exchange's book from each of one or more market participants to a best bid or best offer for the financial instrument. The aggregate number of shares is the total number of shares from one or more orders.

At 1108, the MLIA increments a count or value of an event parameter assigned to the market participant that has the greatest number of resting shares at the best bid or best offer at a selected time (alternately, when the comparison is made). The value for the parameter may, for example, start at or be set at zero.

At 1110, the MLIA determines if there are more times. At 1110, if there are more times for the selected period, the MLIA returns to 1106. If there are no more times for the selected period at 1110, the MLIA analyzes the event parameter value assigned to each market participant for a selected period (such as by comparing the parameter values for each market participant) at 1112. At 1114, the MLIA selects the market participant that has the greatest event parameter value (for example, the highest value in the event parameter) in the selected period to be the market participant that has earned the incentive. In one aspect, if there is a tie between two or more market participants having the same greatest event parameter, the particular member that has the greatest order volume is selected to have earned the incentive. In another aspect, if there is a tie between two or more market participants having the same greatest event parameter, the market participants with the same greatest event parameter are selected to have earned the incentive. At 1116, the MLIA applies the incentive to the selected market participant that earned the incentive, such as to the market participant's account. In one example, the incentive is a reward.

FIG. 12 depicts an exemplary embodiment of an incentive determination process 1200 of a market liquidity incentive application 1202 having one or more modules executed by at least one processor encoded with, or executing instructions of, the MLIA. For example, the incentive determination process 1200 is executed by the local server 102A or computing device 300A, such as at or of an electronic financial exchange.

At 1204, the MLIA 1202 selects market data for shares on the financial exchange's book (e.g. resting shares), such as market data for one or more selected times in a selected period. The market data includes order data for resting shares, including the number of resting shares from one or more orders of one or more financial instruments from each of one or more participants and the corresponding prices for the resting shares, and financial instruments BBO data. Financial instrument BBO data includes data identifying the best bid to buy for a financial instrument and/or the best offer to sell for the financial instrument or such data for multiple financial instruments.

At 1206, the MLIA analyzes the aggregate number of resting shares of a financial instrument from one or more market participants on the exchange's book to a best bid or best offer for the financial instrument, such as by comparing the aggregate number of resting shares of a financial instrument for each market participant. At 1208, the MLIA assigns a unit of value to the market participant that has the greatest number of resting shares at the best bid and assigns a unit of value to the market participant that has the greatest number of resting shares at the best offer, such as when the analysis is made. The units may, for example, be held in a parameter or counter.

At 1210, the MLIA determines if there are more times. At 1210, if there are more times for the selected period, the MLIA returns to 1206. If there are no more times for the selected period at 1210, the MLIA the MLIA analyzes the number of units assigned to each market participant for a selected period at 1212, such as by comparing the number of units assigned to each market participant for the selected period. At 1214, the MLIA selects the market participant that has the greatest number of units in the selected period to be the market participant that has earned the incentive. In one aspect, if there is a tie between two or more market participants having the same greatest number of units, the particular member that has the greatest order volume is selected to have earned the incentive. In another aspect, if there is a tie between two or more market participants having the same greatest number of units, the market participants with the same greatest number of units are selected to have earned the incentive. At 1216, the MLIA applies the incentive to the selected market participant that earned the incentive, such as to the market participant's account. In one example, the incentive is a reward.

FIG. 13 depicts an exemplary embodiment of an incentive determination process 1300 of a market liquidity incentive application 1302 having one or more modules executed by at least one processor encoded with, or executing instructions of, the MLIA. For example, the incentive determination process 1300 is executed by the local server 102A or computing device 300A, such as at or of an electronic financial exchange.

At 1304, the MLIA 1302 selects market data for shares on the financial exchange's book (e.g. resting shares), such as market data for one or more selected times in a selected period. The market data includes order data for resting shares, including the number of resting shares from one or more orders of one or more financial instruments from each of one or more participants and the corresponding prices for the resting shares, and financial instruments BBO data. Financial instrument BBO data includes data identifying the best bid to buy for a financial instrument and/or the best offer to sell for the financial instrument or such data for multiple financial instruments.

At 1306, MLIA analyzes the aggregate number of resting shares of a financial instrument from one or more market participants on the exchange's book to a best bid or best offer for the financial instrument, such as by comparing the aggregate number of resting shares of a financial instrument for each market participant. At 1308, the MLIA assigns a unit of value to the market participant that has the greatest number of resting shares at the best bid and/or best offer, such as when the analysis is made.

At 1310, the MLIA determines if there are more times. At 1310, if there are more times for the selected period, the MLIA returns to 1306. If there are no more times for the selected period at 1310, the MLIA analyzes the number of units assigned to each market participant for a selected period at 1312, such as by comparing the number of units assigned to each market participant for the selected period. At 1314, the MLIA selects the market participant that has the greatest number of units in the selected period to be the market participant that has earned the incentive. In one aspect, if there is a tie between two or more market participants having the same greatest number of units, the particular member that has the greatest order volume is selected to have earned the incentive. In another aspect, if there is a tie between two or more market participants having the same greatest number of units, the market participants with the same greatest number of units are selected to have earned the incentive. At 1316, the MLIA applies the incentive to the selected market participant that earned the incentive, such as to the market participant's account. In one example, the incentive is a reward.

In another aspect, the best bid is the current best bid for the financial instrument, and the best offer is the current best offer for the financial instrument.

Figure 14:
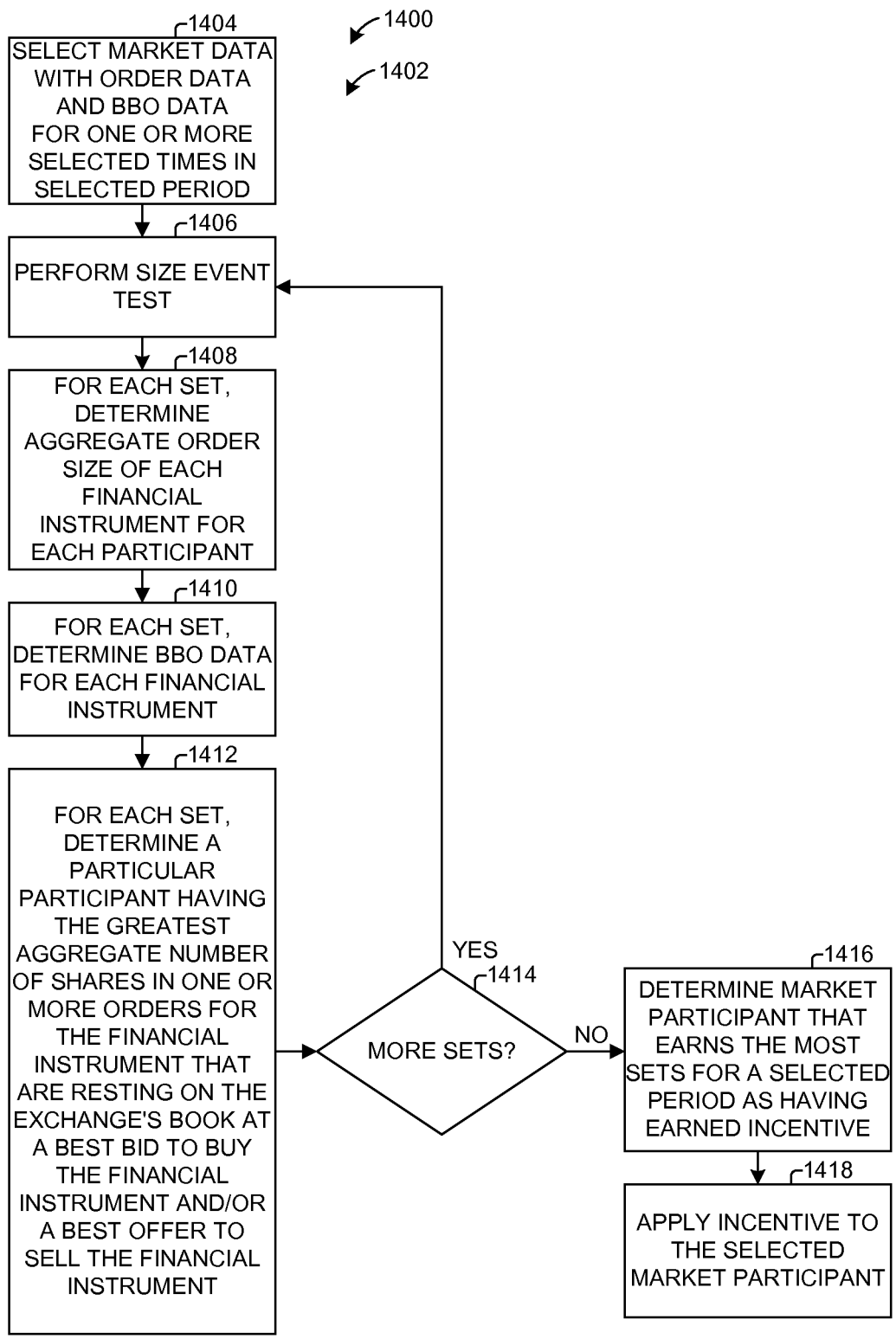

FIG. 14 depicts an exemplary embodiment of an incentive determination process 1400 of a market liquidity incentive application 1402 having one or more modules executed by at least one processor encoded with, or executing instructions of, the MLIA. For example, the incentive determination process 1400 is executed by the local server 102A or computing device 300A, such as at or of an electronic financial exchange.

At 1404, the MLIA 1402 selects market data for shares on the financial exchange's book (e.g. resting shares), such as market data for one or more selected times in a selected period. The market data includes order data for resting shares, including the number of resting shares from one or more orders of one or more financial instruments from each of one or more participants and the corresponding prices for the resting shares, and financial instruments BBO data. Financial instrument BBO data includes data identifying the best bid to buy for a financial instrument and/or the best offer to sell for the financial instrument or such data for multiple financial instruments.

At 1406, the MLIA performs one or more size event tests (SETs) at one or more test times or test periods. A SET is a determination by the MLIA of the aggregate order size of each financial instrument for each participant 1408 and the BBO data for each financial instrument 1410 at a selected time or test time. The aggregate order size is the total number of shares submitted by a participant in one or more orders and that are resting on the exchange's book at a selected time. The BBO data includes data identifying the best bid to buy for a financial instrument and/or the best offer to sell for the financial instrument or such data for multiple financial instruments.

At 1412, the MLIA determines a SET result for each SET that identifies a particular participant as being eligible for a reward or other incentive based on the aggregate order size of orders submitted by that particular participant that include eligible order prices at a best bid to buy and/or a best offer to sell. For the SET result, the MLIA determines a participant earns (or wins) a SET when it has the greatest aggregate number of shares in one or more orders that are resting (that is, pending) on the exchange's book for a selected time at a best bid to buy the financial instrument and/or a best offer to sell the financial instrument for the selected time.

At 1410, the MLIA determines if there are more SETs to perform. For example, the MLIA may perform one or more additional SETs at one or more test times or test periods. If one or more additional SETs are to be performed, the MLIA returns to 1406. If no more SETs are to be performed, the MLIA proceeds to 1416.

At 1416, the MLIA determines that an incentive is earned by and awarded to the participant that earns (or wins) the most SETs during a selected period, such as an hour, day, week, month, a trading period, or other period. In one aspect, if there is a tie between two or more market participants having the same highest number of SETs, the particular member that has the greatest order volume is selected to have earned the incentive. In another aspect, if there is a tie between two or more market participants having the same greatest number of SETs, the market participants with the same highest number of SETs are selected to have earned the incentive. At 1420, the MLIA applies the incentive to the selected market participant that earned the incentive, such as to the market participant's account. In one example, the incentive is a reward.

In one example, a test time may be a time point, a time increment, or another selected time. In one example, one or more test times are time increments. In another example, the one or more test times are one-second time increments. In another example, one or more test times are one or more times during a trading day. One or more test times alternately may be one or more randomized times or one or more non-randomized times. A combination of one or more of the foregoing may be used.

A selected period may be, for example, a trading day (including regular hours only, extended trading hours, auction hours, or a combination of one or more of the foregoing), a week with one or more trading days, a month with one or more trading days, an hour, multiple hours, another period of time, a period with respect to trades, or another period. In one example, a selected period is a trading day, and a test time for the test is each second of the trading day.

In another example, round lots are counted toward the participant's aggregated size. In still another example, a participant must win at least ten percent of the SETs each day to qualify for the incentive.

In one aspect, the incentive is a reward. In one example of this aspect, two participants may receive the reward each day, with the top winner receiving a larger percentage of the reward, and the second-place winner receiving the remaining percentage of the reward. In the event of a tie, the participant with the most executed shares wins the SET.

Figure 15:
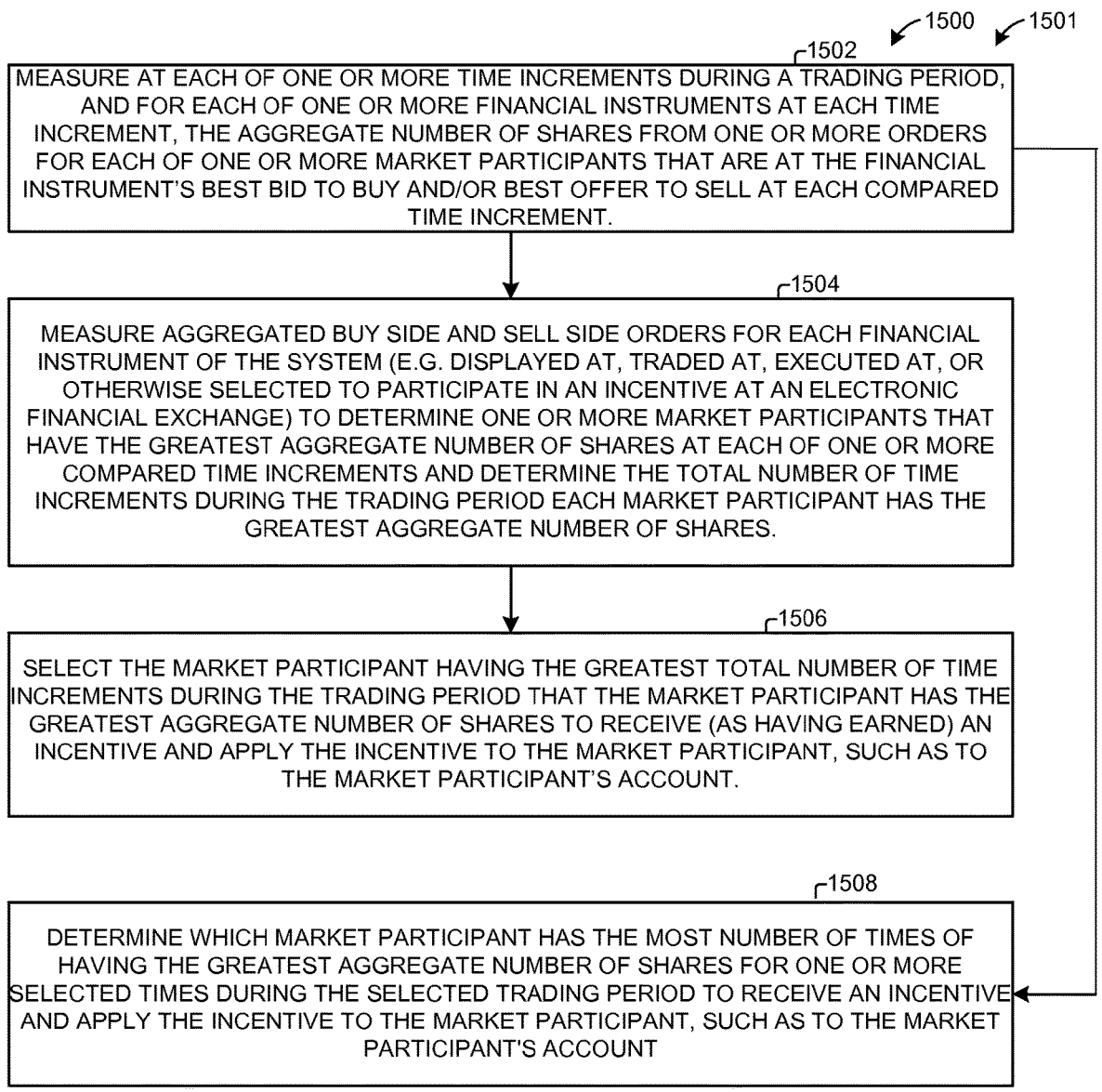

FIG. 15 depicts an exemplary embodiment of an incentive determination process 1500 of a market liquidity incentive application 1501 having one or more modules executed by at least one processor encoded with, or executing instructions of, the MLIA. For example, the incentive determination process 1500 is executed by the local server 102A or computing device 300A, such as at or of an electronic financial exchange.

At 1502, the MLIA measures at each of one or more time increments during a trading period, and for each of one or more financial instruments at each time increment, the aggregate number of shares from one or more orders for each of one or more market participants that are at the financial instrument's best bid to buy and/or best offer to sell at each compared time increment. At 1504, the MLIA measures aggregated buy side and sell side orders for each financial instrument of the system (e.g. displayed at, traded at, executed at, or otherwise selected to participate in an incentive) to determine one or more market participants that have the greatest aggregate number of shares at each of one or more compared time increments and determine the total number of time increments during the trading period each market participant has the greatest aggregate number of shares. At 1506, the MLIA selects the market participant having the greatest total number of time increments during the trading period that the market participant has the greatest aggregate number of shares to receive (as having earned) an incentive and applies the incentive to the market participant, such as to the market participant's account. One or more market participants can have the greatest aggregate number of shares at each of one or more compared time increments. In one aspect, the MLIA determines the one or more market participants that have the greatest aggregate number of shares at the best bid to buy and the one or more market participants that have the greatest aggregate number of shares at the best offer to sell. In one aspect, the MLIA determines the one or more market participants that have the greatest aggregate number of shares combined at the best bid to buy and the best offer to sell.

Alternately at 1508, in place of 1504 and 1506, the MLIA 1501 determines which market participant has the most number of times of having the greatest aggregate number of shares for one or more selected times during the selected trading period to receive an incentive and applies the incentive to the market participant, such as to the market participant's account.

Figure 16:
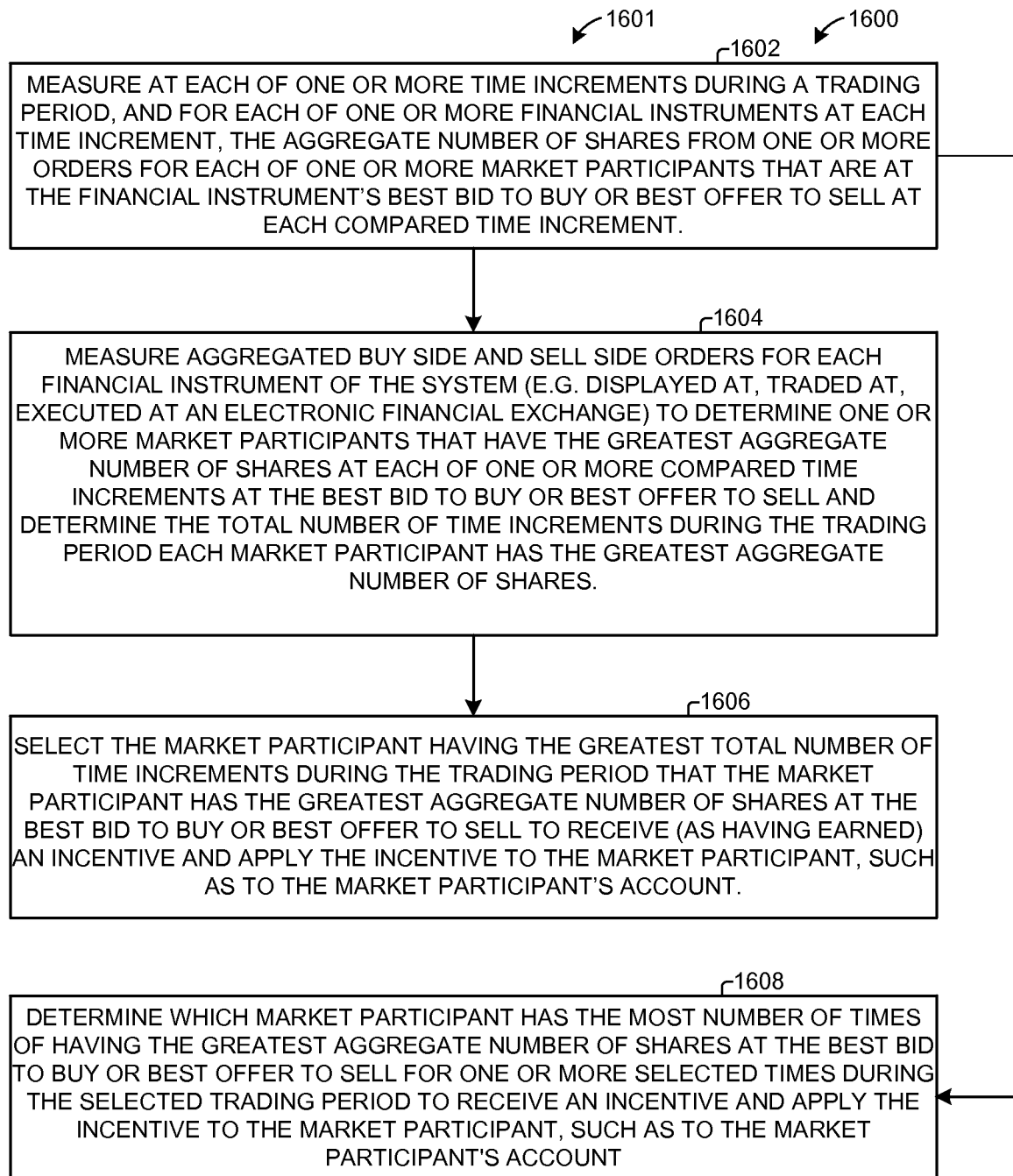

FIG. 16 depicts an exemplary embodiment of an incentive determination process 1600 of a market liquidity incentive application 1601 having one or more modules executed by at least one processor encoded with, or executing instructions of, the MLIA. For example, the incentive determination process 1600 is executed by the local server 102A or computing device 300A, such as at or of an electronic financial exchange.

At 1602, the MLIA measures at each of one or more time increments during a trading period, and for each of one or more financial instruments at each time increment, the aggregate number of shares from one or more orders for each of one or more market participants that are at the financial instrument's best bid to buy or best offer to sell at each compared time increment. At 1604, the MLIA measures aggregated buy side and sell side orders for each financial instrument of the system (e.g. displayed at, traded at, executed at) to determine one or more market participants that have the greatest aggregate number of shares at each of one or more compared time increments at the best bid to buy or best offer to sell and determine the total number of time increments during the trading period each market participant has the greatest aggregate number of shares. At 1606, the MLIA selects the market participant having the greatest total number of time increments during the trading period that the market participant has the greatest aggregate number of shares at the best bid to buy or best offer to sell to receive (as having earned) an incentive and applies the incentive to the market participant, such as to the market participant's account. In this example, the MLIA measures aggregated buy side and/or sell side orders for each financial instrument of the system. One or more market participants can have the greatest aggregate number of shares at each of one or more compared time increments. In one aspect, the MLIA determines the one or more market participants that have the greatest aggregate number of shares at the best bid to buy or the one or more market participants that have the greatest aggregate number of shares at the best offer to sell. In one aspect, the MLIA determines the one or more market participants that have the greatest aggregate number of shares combined at the best bid to buy or the best offer to sell.

Alternately at 1608, in place of 1604 and 1606, the MLIA 1601 determines which market participant has the most number of times of having the greatest aggregate number of shares at the best bid to buy or best offer to sell for one or more selected times during the selected trading period to receive an incentive and applies the incentive to the market participant, such as to the market participant's account.

Figure 17:
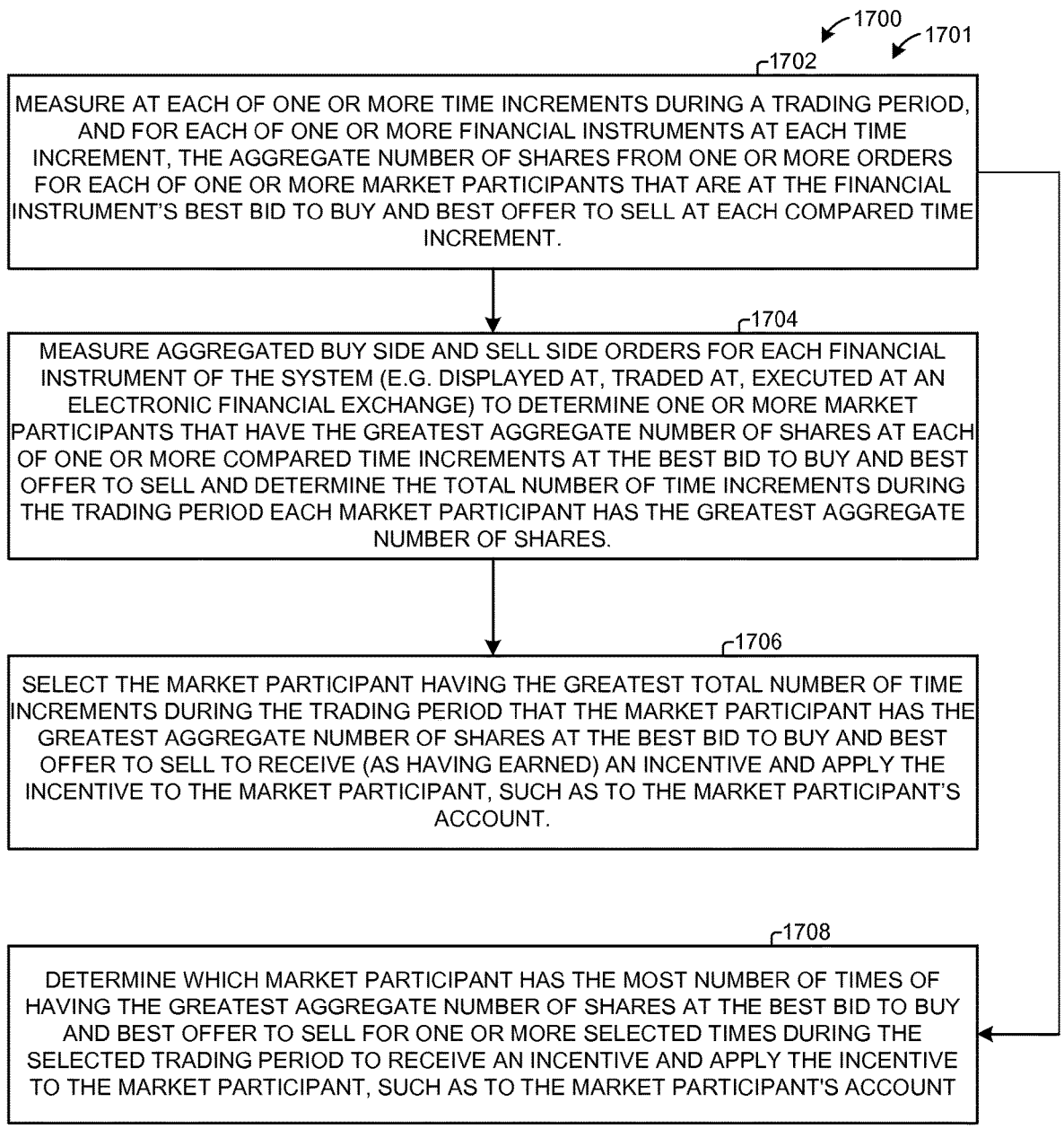

FIG. 17 depicts an exemplary embodiment of an incentive determination process 1700 of a market liquidity incentive application 1701 having one or more modules executed by at least one processor encoded with, or executing instructions of, the MLIA. For example, the incentive determination process 1700 is executed by the local server 102A or computing device 300A, such as at or of an electronic financial exchange.

At 1702, the MLIA measures at each of one or more time increments during a trading period, and for each of one or more financial instruments at each time increment, the aggregate number of shares from one or more orders for each of one or more market participants that are at the financial instrument's best bid to buy and best offer to sell at each compared time increment. At 1704, the MLIA measures aggregated buy side and sell side orders for each financial instrument of the system (e.g. displayed at, traded at, executed at) to determine one or more market participants that have the greatest aggregate number of shares at each of one or more compared time increments at the best bid to buy and best offer to sell and determine the total number of time increments during the trading period each market participant has the greatest aggregate number of shares. At 1706, the MLIA selects the market participant having the greatest total number of time increments during the trading period that the market participant has the greatest aggregate number of shares at the best bid to buy and best offer to sell to receive (as having earned) an incentive and applies the incentive to the market participant, such as to the market participant's account. In this example, the MLIA measures aggregated buy side and sell side orders for each financial instrument of the system. One or more market participants can have the greatest aggregate number of shares at each of one or more compared time increments. In one aspect, the MLIA determines the one or more market participants that have the greatest aggregate number of shares at the best bid to buy and the one or more market participants that have the greatest aggregate number of shares at the best offer to sell. In one aspect, the MLIA determines the one or more market participants that have the greatest aggregate number of shares combined at the best bid to buy and the best offer to sell.

Alternately at 1708, in place of 1704 and 1706, the MLIA 1701 determines which market participant has the most number of times of having the greatest aggregate number of shares at the best bid to buy and best offer to sell for one or more selected times during the selected trading period to receive an incentive and applies the incentive to the market participant, such as to the market participant's account.

Figure 18:
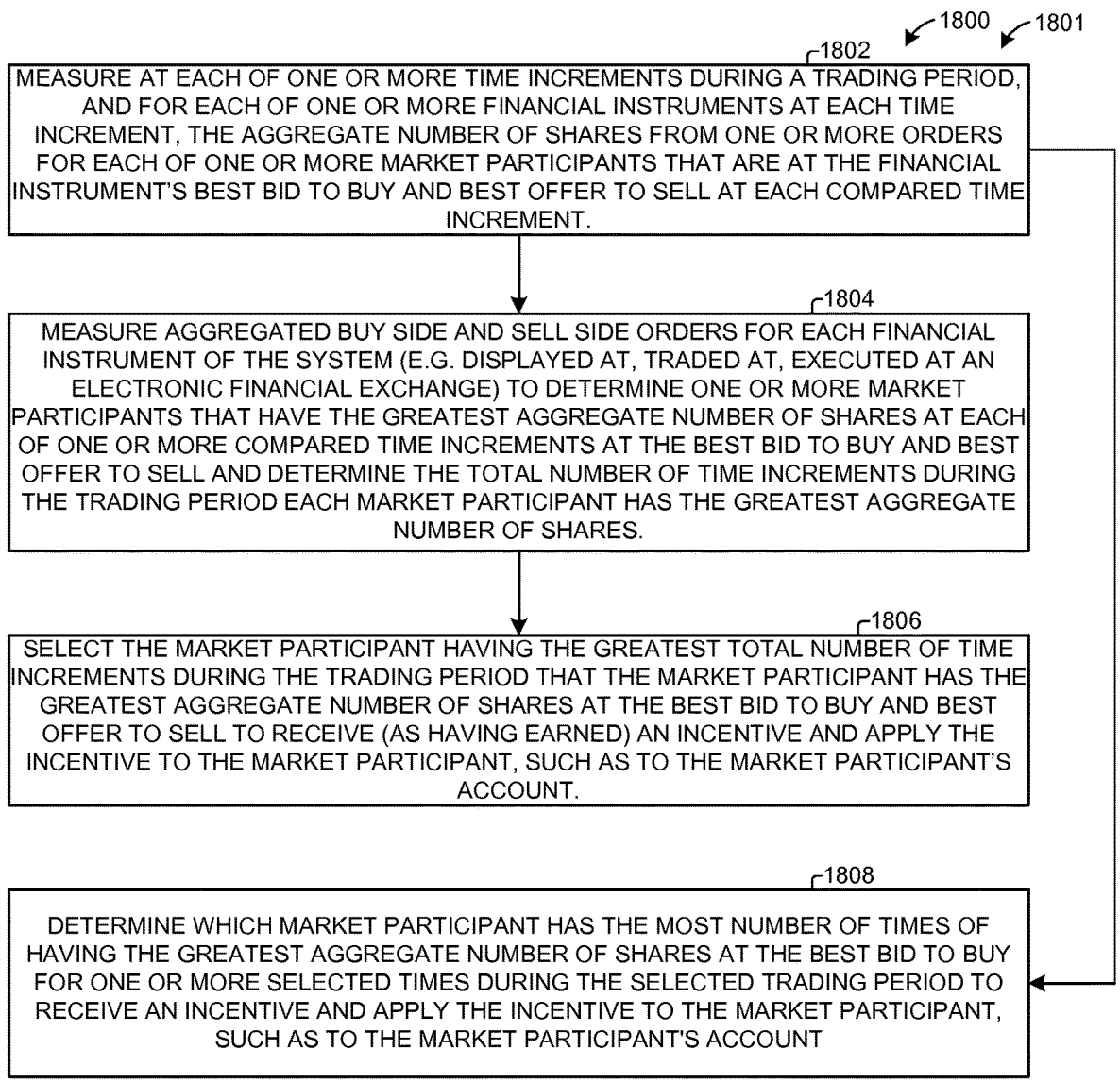

FIG. 18 depicts an exemplary embodiment of an incentive determination process 1800 of a market liquidity incentive application 1801 having one or more modules executed by at least one processor encoded with, or executing instructions of, the MLIA. For example, the incentive determination process 1800 is executed by the local server 102A or computing device 300A, such as at or of an electronic financial exchange.

At 1802, the MLIA measures at each of one or more time increments during a trading period, and for each of one or more financial instruments at each time increment, the aggregate number of shares from one or more orders for each of one or more market participants that are at the financial instrument's best bid to buy at each compared time increment. At 1804, the MLIA measures aggregated buy side and sell side orders for each financial instrument of the system (e.g. displayed at, traded at, executed at) to determine one or more market participants that have the greatest aggregate number of shares at each of one or more compared time increments at the best bid to buy and determine the total number of time increments during the trading period each market participant has the greatest aggregate number of shares. At 1806, the MLIA selects the market participant having the greatest total number of time increments during the trading period that the market participant has the greatest aggregate number of shares at the best bid to buy to receive (as having earned) an incentive and applies the incentive to the market participant, such as to the market participant's account. In this example, the MLIA measures aggregated buy side orders for each financial instrument of the system. In one aspect of this example, sell side orders optionally are not analyzed by the MLIA for the purpose of determining aggregate number of buy side shares. In another aspect of this example, sell side orders optionally are not analyzed by the MLIA for the purpose of determining aggregate number of buy side shares except to identify quotes or their existence for the various orders. One or more market participants can have the greatest aggregate number of shares at each of one or more compared time increments.

Alternately at 1808, in place of 1804 and 1806, the MLIA 1801 determines which market participant has the most number of times of having the greatest aggregate number of shares at the best bid to buy for one or more selected times during the selected trading period to receive an incentive and applies the incentive to the market participant, such as to the market participant's account.

Figure 19:
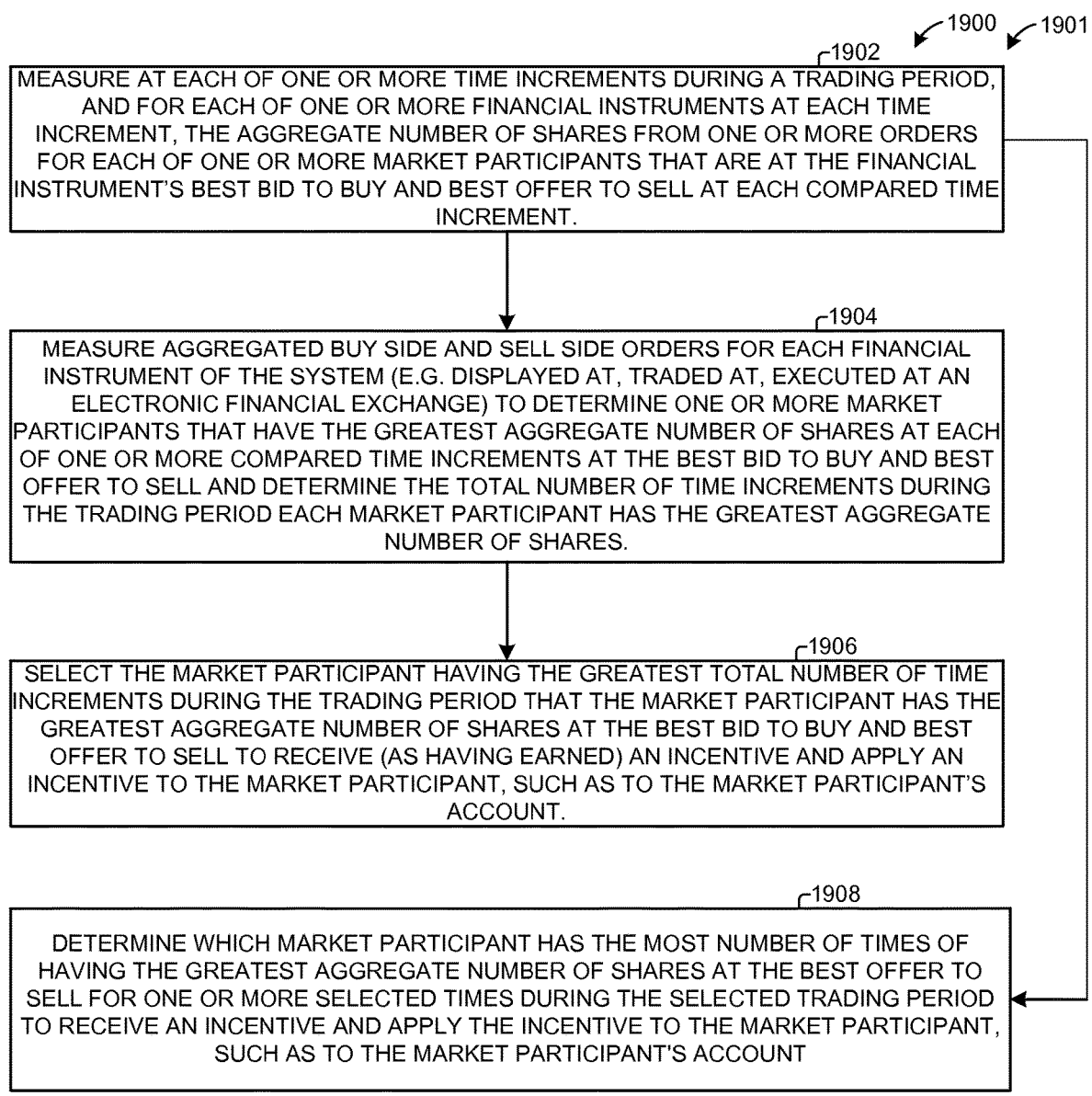

FIG. 19 depicts an exemplary embodiment of an incentive determination process 1900 of a market liquidity incentive application 1901 having one or more modules executed by at least one processor encoded with, or executing instructions of, the MLIA. For example, the incentive determination process 1900 is executed by the local server 102A or computing device 300A, such as at or of an electronic financial exchange.

At 1902, the MLIA measures at each of one or more time increments during a trading period, and for each of one or more financial instruments at each time increment, the aggregate number of shares from one or more orders for each of one or more market participants that are at the financial instrument's best offer to sell at each compared time increment. At 1904, the MLIA measures aggregated buy side and sell side orders for each financial instrument of the system (e.g. displayed at, traded at, executed at) to determine one or more market participants that have the greatest aggregate number of shares at each of one or more compared time increments at the best offer to sell and determine the total number of time increments during the trading period each market participant has the greatest aggregate number of shares. At 1906, the MLIA selects the market participant having the greatest total number of time increments during the trading period that the market participant has the greatest aggregate number of shares at the best offer to sell to receive (as having earned) an incentive and applies the incentive to the market participant, such as to the market participant's account. In this example, the MLIA measures aggregated sell side orders for each financial instrument of the system. In one aspect of this example, buy side orders optionally are not analyzed by the MLIA for the purpose of determining aggregate number of sell side shares. In another aspect of this example, buy side orders optionally are not analyzed by the MLIA for the purpose of determining aggregate number of sell side shares except to identify quotes or their existence for the various orders. One or more market participants can have the greatest aggregate number of shares at each of one or more compared time increments.

Alternately at 1908, in place of 1904 and 1906, the MLIA 1901 determines which market participant has the most number of times of having the greatest aggregate number of shares at the best offer to sell for one or more selected times during the selected trading period to receive an incentive and applies the incentive to the market participant, such as to the market participant's account.

In one example of one or more of the systems and methods of FIGS. 15-19, only one market participant (or alternately tying market participant) wins one SET or time increment for each of one or more financial instrument selected to participate in an incentive, e.g. one SET per financial instrument per time increment. In another example, two market participants (or alternately tying market participant) win a SET or time increment for each of one or more financial instrument selected to participate, e.g. two SETs per financial instrument per time increment.

Combinations and/or sub-combinations of the above and systems, modules, components, and methods described herein may be made.

Those skilled in the art will appreciate that variations from the specific embodiments disclosed above are contemplated by the invention. The invention should not be restricted to the above embodiments, but should be measured by the following claims.

What is claimed is:

1. A market liquidity incentive system for an electronic financial exchange comprising:
a memory with a counter for each of a plurality of market participants; and
a processor coupled to the memory and configured to:
select market data for resting shares on a book for the electronic financial exchange for one or more selected times during a selected period, the market data comprising order data for resting shares, including a total number of resting shares from one or more orders of one or more financial instruments from each of one or more participants and corresponding prices for the resting shares, and best bids to buy and best offers to sell for the one or more financial instruments;
for each selected time, analyze the order data and the best bids to buy and best offers to sell and increment a counter value of the counter by a selected value for each market participant that has the greatest total number of resting shares from one or more orders for a particular financial instrument at the financial instrument's best bid to buy or best offer to sell;
analyze the counter values assigned to each market participant for the selected period to determine the market participant that has a highest counter value in the selected period,
select the market participant that has the highest counter value in the selected period to be the market participant eligible for a reward;
communicate, through a computer network, with a server comprising a data source memory to obtain information indicative of a reward data
determine a reward amount of the reward based on a tier level of the particular financial instrument and the reward data by:
identifying an instrument identification of the particular financial instrument and a class type associated with the instrument identification; and
identifying the tier level of the particular financial instrument based on the class type;
apply the reward to the selected market participant; and
transmit the order data to a routing device that disseminates the order data to a remote device for display by the remote device.

2. The system of claim 1, wherein to increment the counter value, the processor is configured to increment the counter value by a total number of resting shares from the one or more orders for the particular financial instrument that were at the financial instrument's best bid to buy or best offer to sell at the selected time.

3. The system of claim 1, wherein to increment the counter value, the processor is configured to increment the counter value by a unit.

4. The system of claim 1, wherein to analyze the counter values assigned to each market participant, the processor is configured to compare the counter values of each market participant's counter.

5. The system of claim 1, wherein to analyze the order data and the best bids to buy and the best offers to sell, the processor is configured to compare the order data for each market participant to the best bids to buy and the best offers to sell for the selected time.

6. The system of claim 1, wherein the selected time comprises at least one of a time, a time point, a time increment, and a one-second time increment.

7. The system of claim 1, wherein the selected time is during a trading day.

8. The system of claim 1, wherein the selected time is at least one of a randomized time and a non-randomized time.

9. The system of claim 1, wherein the selected period comprises at least one of a trading day, the trading day with regular trading hours, the trading day with extended trading hours, the trading day with auction hours, a week with one or more trading days, a month with one or more trading days, an hour, multiple hours, and a period with respect to trades.

10. The system of claim 1, wherein the processor is configured to limit the analysis to order data for one or more selected financial instruments and best bid or offer (BBO) data for the selected financial instruments, the BBO data comprising best bid to buy data and/or best offer to sell data.

11. The system of claim 1, wherein to analyze the order data and the best bids to buy and the best offers to sell, the processor is configured to analyze the order data and best bid or offer (BBO) data for only best bids to buy.

12. The system of claim 1, wherein to analyze the order data and the best bids to buy and the best offers to sell, the processor is configured to analyze the order data and best bid or offer (BBO) data for only best offers to sell.

13. The system of claim 1, wherein to analyze the order data, the processor is configured to analyze only order data from orders displayed at the electronic financial exchange.

14. The system of claim 1, wherein to analyze the order data, the processor is configured to analyze only order data from orders displayable at the electronic financial exchange.

15. The system of claim 1, wherein the data source memory includes a reward amount table comprising one or more reward amount records corresponding to the identified tier level.

16. The system of claim 1, wherein the identified tier level is a first tier level or a second tier level, the reward amount corresponding to the first tier level is higher than the reward amount corresponding to the second tier level.

17. The system of claim 1, wherein the processor is further configured to:
access a database to obtain a reward eligible indicator to indicate whether an order price of each of the one or more orders is a reward eligible order price.

18. A market liquidity incentive system comprising:
a memory with a counter for each of a plurality of market participants; and
a processor coupled to the memory and configured to:
select market data for resting shares on an electronic financial exchange's book for one or more selected times during a selected period, the market data comprising order data for resting shares, including a total number of resting shares from one or more orders of one or more financial instruments from each of one or more participants and corresponding prices for the resting shares, and best bids to buy and best offers to sell for the financial instruments;
for each selected time, analyze the order data and the best bids to buy and best offers to sell and increment a counter value of a counter for a market participant by a selected value for each market participant that has a greatest total number of resting shares from one or more orders for a particular financial instrument at a financial instrument's best bid to buy or best offer to sell;

analyze the counter values assigned to each market participant for the selected period to determine the market participant that has a highest counter value in the selected period;

select the market participant that has the highest counter value in the selected period to be the market participant eligible for a reward;

communicate, through a computer network, with a server comprising a data source memory to obtain information indicative of a reward data;

determine a reward amount of the reward based on a tier level of the particular financial instrument and the reward data by:
  identifying an instrument identification of the particular financial instrument and a class type associated with the instrument identification; and
  identifying the tier level of the particular financial instrument based on the class type;

apply the reward to the selected market participant; and transmit the order data to a routing device that disseminates the order data to a remote device for display by the remote device.

19. A market liquidity incentive method executed by at least one processor of an electronic financial exchange, the method comprising:

selecting market data for resting shares on a book for the electronic financial exchange for one or more selected times during a selected period, the market data comprising order data for resting shares, including a total number of resting shares from one or more orders of one or more financial instruments from each of one or more participants and corresponding prices for the resting shares, and best bids to buy and best offers to sell for the financial instruments;

for each selected time, incrementing a counter value of a counter by a selected value for each market participant that has the greatest total number of resting shares from one or more orders for a particular financial instrument at the financial instrument's best bid to buy or best offer to sell;

analyzing the counter values assigned to each market participant for the selected period to determine the market participant that has a highest counter value in the selected period;

selecting the market participant that has the highest counter value in the selected period to be the market participant eligible for a reward;

communicating, through a computer network, with a server comprising a data source memory to obtain information indicative of a reward data;

determining a reward amount of the reward based on a tier level of the particular financial instrument and the reward data by:
  identifying an instrument identification of the particular financial instrument and a class type associated with the instrument identification; and
  identifying the tier level of the particular financial instrument based on the class type;

applying the reward to the selected market participant; and transmitting the order data to a routing device that disseminates the order data to a remote device for display by the remote device.

20. A non-transitory, computer-readable storage medium having instructions stored thereon, that when executed by at least one processor, cause the at least one processor to:

select market data for resting shares on an electronic financial exchange's book for one or more selected times during a selected period, the market data comprising order data for resting shares, including a total number of resting shares from one or more orders of one or more financial instruments from each of one or more participants and corresponding prices for the resting shares, and best bids to buy and best offers to sell for the financial instruments;

for each selected time, increment a counter value of a counter for a market participant by a selected value for each market participant that has a greatest total number of resting shares from one or more orders for a particular financial instrument at a financial instrument's best bid to buy or best offer to sell;

analyze the counter values assigned to each market participant for the selected period to determine the market participant that has a highest counter value in the selected period;

select the market participant that has the highest counter value in the selected period to be the market participant eligible for a reward;

communicate, through a computer network, with a server comprising a data source memory to obtain information indicative of a reward data;

determine a reward amount of the reward based on a tier level of the particular financial instrument and the reward data by:
  identifying an instrument identification of the particular financial instrument and a class type associated with the instrument identification; and
  identifying the tier level of the particular financial instrument based on the class type;

apply the reward to the selected market participant; and transmit the order data to a routing device that disseminates the order data to a remote device for display by the remote device.

* * * * *